US008271796B2

(12) United States Patent
Diamond

(10) Patent No.: US 8,271,796 B2
(45) Date of Patent: Sep. 18, 2012

(54) APPARATUS FOR SECURE COMPUTATION OF STRING COMPARATORS

(75) Inventor: Jeff Diamond, Winnipeg (CA)

(73) Assignee: Telecommunications Research Laboratory, Edmonton, AB ( * ) Notice: Subject to any disclaimer, the term of this patent is extended or adjusted under 35 U.S.C. 154(b) by 743 days.

(21) Appl. No.: 12/463,171

(22) Filed: May 8, 2009

(65) Prior Publication Data

US 2009/0282039 A1   Nov. 12, 2009

Related U.S. Application Data

(60) Provisional application No. 61/052,335, filed on May 12, 2008.

(51) Int. Cl.
*H04L 29/06* (2006.01)
*G06F 21/00* (2006.01)

(52) U.S. Cl. ............... 713/180; 707/1; 707/6; 713/168; 713/182

(58) Field of Classification Search ........................ None
See application file for complete search history.

(56) References Cited

U.S. PATENT DOCUMENTS

| | | | | |
|---|---|---|---|---|
| 4,490,811 | A * | 12/1984 | Yianilos et al. ........................ | 1/1 |
| 6,009,424 | A * | 12/1999 | Lepage et al. ........................ | 1/1 |
| 6,219,633 | B1 * | 4/2001 | Lepage .............................. | 704/9 |
| 2003/0093673 | A1 * | 5/2003 | Gelbord ......................... | 713/168 |
| 2004/0220895 | A1 * | 11/2004 | Carus et al. ....................... | 707/1 |
| 2007/0156586 | A1 * | 7/2007 | Kerschbaum .................. | 705/50 |
| 2008/0091674 | A1 * | 4/2008 | Allen et al. ........................ | 707/6 |
| 2009/0006855 | A1 * | 1/2009 | Tuyls et al. .................... | 713/182 |
| 2010/0008505 | A1 * | 1/2010 | Bai .............................. | 380/255 |

OTHER PUBLICATIONS

Ravikumar P., Cohen W.W., and Fienberg S.E., "A Secure Protocol for Computing String Distance Metrics", Proceedings of the Workshop on Privacy and Security Aspects of Data Mining, pp. 40-46, Brighton, UK, 2004.*
Du, W., Atallah M.J.: "Secure multi-party computation problems and their applications: a review and open problems", NSPW '01: Proceedings of the 2001 workshop on New Security Paradigms, 2001, pp. 13-22.*
Cohen, W., Ravikumar, P., Fienberg, S.: A comparison of string metrics for matching names and records. In: Proceedings of the workshop on Data Cleaning and Object Consolidation at the International Conference on Knowledge Discovery and Data Mining, KDD (2003).*
Atallah, M.J., Du, W.: "Secure Multi-Party Computational Geometry". WADS '01: Proceedings of the 7th International Workshop on Algorithms and Data Structures, 2001, pp. 165-179.*
Atallah M.J., Kerschbaum, F., Du, W., "Secure and private sequence comparisons", WPES '03: Proceedings of the 2003 ACM workshop on Privacy in the electronic society, Washington D.C., pp. 39-44.*
Clifton, C., Kantarcioglu, M., Lin, X.D., Vaidya, J., Zhu, M., "Tools for privacy preserving distributed data mining", SIGKDD Explorations, 4(2), pp. 2834, Jan. 2003.*
Christen, P., Churches, T., Hegland, M., "'Febrl—A Parallel Open Source Data Lindage System'", Proceedings of the 8th Pacific-Asisa Conference, PAKDD 2004, Sydney, Australia, May 26-28, 2004, pp. 638-647.*
Churches, T., Christen, P., "Blind Data Linkage using n-gram Similarity Comparisons", Proceedings of the 8th PAKDD '04 (Pacific-Asia Conference on Knowledge Discovery and Data Mining), Sydney, May 2004, pp. 121-126.*
Churches, T., Christen, P., "Some methods for blindfolded record linkage", BMC Medical Informatics and Decision Making, vol. 4, 2004.*
Du, W., Atallah M.J., Kerschbaum, F., "'Protocols for secure Remote database Access with Approximate Matching'", 7th ACM Conference on Computer and Communications Security (ACMCCS 2000), Athens, Greece, Nov. 2000.*
Dunn, H.L., "Record Linkage", American Journal of Public Health, vol. 36 (1946), pp. 1412-1416.*
Naor, M., Pinkas, B., "Oblivious Transfer and Polynomial Evaluation", Proc. of the 31st Syrnp. on Theory of Computer Science (STOC), Atlanta, GA., pp. 245-254, May 1-4, 1999.*
Naor, M., Pinkas, B., "Efficient Oblivious Transfer Protocols", Proceedings of SODA 2001 (SIAM Symposium on Discrete Algorithms), Washington D.C., Jan. 7-9, 2001.*
Winkler, W. E., "String Comparator Metrics and Enhanced Decision Rules in the Fellegi-Sunter Model of Record Linkage" Proceedings of the Section on Survey Research Methods, American Statistical Assn., 1990, pp. 354-359.*
Winkler, W.E., Thibaudeau, Y., "An Application of the Fellegi-Sunter Model of Record Linkage to the 1990 U.S. Decennial Census", Statistical Research Report Series RR91/09, U.S. Bureau of the Census, Washington, D.C., 1991.*
Yao, A.C., "Protocols for secure computations", In Proc. 23rd FOCS, New York, 1982, pp. 160-164.*
Yamamura, A., Saito, T., "Private Information Retrieval Based on the Subgroup Membership Problem", In V. Varadhara jan and Y. Mu, editors, Proceedings of ACISP 2001, vol. 2119 of LINCS, pp. 206220. Springer-Verlag, 2001.*
Yancey, W.E., "Evaluating String Comparator Performance for Record Linkage", Statistical Research Report Series (statistics #2005-05), U.S. Census Bureau, Washington, D.C., Jun. 13, 2005.*

* cited by examiner

*Primary Examiner* — Philip Chea
*Assistant Examiner* — Dorianne Alvarado David
(74) *Attorney, Agent, or Firm* — Adrian D. Battison; Ade & Company Inc.

(57) ABSTRACT

We present an apparatus which can be used so that one party learns the value of a string distance metric applied to a pair of strings, each of which is held by a different party, in such a way that none of the parties can learn anything else significant about the strings. This apparatus can be applied to the problem of linking records from different databases, where privacy and confidentiality concerns prohibit the sharing of records. The apparatus can compute two different string similarity metrics, including the bigram based Dice coefficient and the Jaro-Winkler string comparator. The apparatus can implement a three party protocol for the secure computation of the bigram based Dice coefficient and a two party protocols for the Jaro-Winkler string comparator which are secure against collusion and cheating. The apparatus implements a three party Jaro-Winkler string comparator computation which is secure in the case of semi-honest participants.

16 Claims, No Drawings

APPARATUS FOR SECURE COMPUTATION OF STRING COMPARATORS

This application claims priority under 35 U.S.C. 119 from U.S. Provisional Application Ser. No. 61/052,335 filed May 12, 2008.

This invention relates to an apparatus for computing a measure of similarity for two strings of characters and for displaying that measure.

BACKGROUND OF THE INVENTION

The following references have some relevance in this matter.

[1] Mikhail J. Atallah and Wenliang Du, "'Secure Multi-party Computational Geometry'", WADS '01: Proceedings of the 7th International Workshop on Algorithms and Data Structures, 2001, pp. 165-179.
[2] Mikhail J. Atallah and Florian Kerschbaum and Wenliang Du, "'Secure and private sequence comparisons'", WPES '03: Proceedings of the 2003 ACM workshop on Privacy in the electronic society, Washington D.C., pp. 39-44.
[3] Chris Clifton, Murat Kantarcioglu, Xiao dong Lin, Jaldeep Vaidya, and Michael Zhu, "Tools for privacy preserving distributed data mining", SIGKDD Explorations, 4(2), pp. 2834, January 2003.
[4] Peter Christen, Tim Churches and Markus Hegland, "'Febrl—A Parallel Open Source Data Lindage System'", Proceedings of the 8th Pacific-Asisa Conference, PAKDD 2004, Sydney, Australia, May 26-28, 2004, pp. 638-647.
[5] Tim Churches and Peter Christen, "'Blind Data Linkage using n-gram Similarity Comparisons'", Proceedings of the 8th PAKDD '04 (Pacific-Asia Conference on Knowledge Discovery and Data Mining), Sydney, May 2004, pp. 121-126.
[6] Tim Churches Tim and Peter Christen, "'Some methods for blindfolded record linkage'", BMC Medical Informatics and Decision Making, vol 4, 2004.
[7] Wenliang Du and Mikhail J. Atallah, "'Secure multi-party computation problems and their applications: a review and open problems'", NSPW '01: Proceedings of the 2001 workshop on New security paradigms, 2001, pp. 13-22.
[8] Wenliang Du, Mikhail J. Atallah and Florian Kerschbaum "'Protocols for secure Remote database Access with Approximate Matching'", 7th ACM Conference on Computer and Communications Security (ACMCCS 2000), Athens, Greece, November 2000.
[9] Halbert L. Dunn, "Record Linkage", American Journal of Public Health, Vol. 36 (1946), pp. 1412-1416.
[10] M. Naor and B. Pinkas, "Oblivious Transfer and Polynomial Evaluation", Proc. of the 31st Syrnp. on Theory of Computer Science (STOC), Atlanta, Ga., pp. 245-254, May 1-4, 1999.
[11] M. Naor and B. Pinkas, "Efficient Oblivious Transfer Protocols", Proceedings of SODA 2001 (SIAM Symposium on Discrete Algorithms), Washington D.C., Jan. 7-9, 2001.
[12] Ravikumar P., Cohen W. W. and Fienberg S. E., A secure protocol for computing string distance metrics, Proceedings of the Workshop on Privacy and Security Aspects of Data Mining, pages 40-46, Brighton, UK, 2004
[13] W. E. Winkler, "String Comparator Metrics and Enhanced Decision Rules in the Fellegi-Sunter Model of Record Linkage" Proceedings of the Section on Survey Research Methods, American Statistical Assn., 1990, pp. 354-359.
[14] William E. Winkler and Yves Thibaudeau, "An Application of the Fellegi-Sunter Model of Record Linkage to the 1990 U.S. Decennial Census", Statistical Research Report Series RR91/09, U.S. Bureau of the Census, Washington, D.C., 1991.
[15] Andrew C Yao., "'Protocols for secure computations'", In Proc. 23rd FOCS, New York, 1982, pp. 160-164.
[16] Akihiro Yamamura and Taiichi Saito, "Private Information Retrieval Based on the Subgroup Membership Problem", In V. Varadhara jan and Y. Mu, editors, Proceedings of ACISP 2001, volume 2119 of LINCS, pages 206220. Springer-Verlag, 2001.

The term Record Linkage refers to the process of determining records in one database which correspond to the same entity as a record or records in some other database. This is a common process in a number of fields within the health domain, including health data management, health research and disease surveillance. The technique is also commonly applied in preprocessing data for data mining tasks to remove duplicates, in the processing of census and historical data and in a number of other domains.

An example of an application within the health surveillance is the elimation of duplicate lab test results. In some cases, more than one lab might report a positive test of some disease for the same patient, in which case it is important to link those two tests so that the number of instances of positive tests is not over-counted. Another example of an application is a case where a positive test for some disease is reported in two different geographic locations. If record linkage can determine that those tests correspond to the same patient, this may be inportant information for the tracking of the disease.

Record linkage was first introduced in [9]. Record linkage methods include deterministic algorithms, which use a pre-defined set of rules to determine the linkage of two records based on the exact agreement or disagreement of various fields, and probabilistic algorithms, which specify a pair of records as a link, no-link, or uncertain based on the value of some likelihood score of the set of agreements and disagreements of various fields.

Errors in first names and surnames in database records are common, often occurring in as many as twenty percent of names, due to typographical errors or errors from optical character recognition. Also, various versions of the same name (such as "'John'" and "'Johnny'") can occur in different records which refer to the same entity. Because of this, it is often useful in record linkage to make use of approximate string comparators which can provide a measure of the similarity of two fields in a record which is more general than the binary exact-match/non-exact-match measure.

A number of approximate string comparators have been proposed or used in practice to date. These include the bi-gram or n-gram string comparators, the Jaro-Winkler string comparator, the longest common sub-string comparator, edit distance such as the Levenshtein edit distance, bag distance, and others. Many of these are implemented in the open-source record linkage project Febrl (Freely extensible bio-medical record linkage), by Peter Christen and Tim Churches [4]. There are also a number of other schemes including some which use compression to calculate similarity and some which first use a phonetic coding algorithm to convert strings to some representation of their sound when vocalized and then apply a comparison metric to those representations.

The bigram string comparator, known as the Dice Coefficient is commonly used in a number of applications in computer science. In this scheme, a string of n characters is broken up into n−1 pairs of adjacent characters, each pair of which is called a bigram. The Dice coefficient is given as the ratio of the number of bigrams which the two strings have in common to the average of the number of bigrams in the two strings. An n-gram based string comparator is a generalization of this concept from pairs of adjacent strings to substrings of length n.

The edit distance between two strings is the minimum number of operations, including insertions, deletions and substitutions, which is required to convert one string into the other. The length of the longest common substring is closely related to the edit distance, in that it is a special case of a weighted edit-distance in which insertions, deletions and substitutions are weighted differently [2].

The Jaro-Winkler string comparator was developed by the United States Census Bureau [14]. It finds the number of common characters in the two strings and the number of transpositions of those common characters. It also considers characters which are approximately matched in some sense and the number of consecutive matching characters in the beginning of the string. We outline the Jaro-Winkler measure in detail in Section.

Many different organizations in the health sector and in other domains collect a great deal of data which can benefit from record linkage. It is often not feasible to perform this record linkage when the sets of records which need to be linked belong to different organizations or to different political jurisdictions. In those cases, privacy and confidentiality considerations prohibit the sharing across organizational or jurisdictional boundaries of the information contained in those records. However, if it were possible to compare two records belonging to different databases in such a way that no information about the records, other than a measure of similarity, is learned by either party, then data linkage may be possible without jeopardizing privacy or confidentiality. The algorithms in this document describe one method for accomplishing a Jaro-Winkler string comparison between two strings in two separate databases in such a way that no other information, other than some minimal innocuous information, is learned by either party.

The concept of secure multiparty computation was introduced in [15], in which a problem called the Millionaire Problem was described. In this problem, two millionaires must determine which of the two is richer without either being able to learn anything else about the worth of the other. A great deal of literature has been generated since then, describing various methods to solve similar problems, wherein a number of parties, each holding some secret information, wish to collectively compute some function of those secret inputs without any of the parties learning the secrets of any others. A review of some of these results, including a classification of different types of such problems can be found in [7].

In theory, a solution always exists for any secure multiparty computational problem, however solutions which apply this general result directly are often impractical and inefficient. For this reason, specific solutions are developed for specific problems, which are more practical and efficient.

Secure multiparty computation problems can differ in the assumptions which are made about the nature of the participants. One particular special case of interest is the assumption of the semi-honest participants. A semi-honest participant is a participant who will learn anything which they can from the data which they gain access to, but will follow the protocol correctly. This generally disallows collusion, so that for example, a semi-trusted third party can be used in a protocol involving two other participants in which the third party can hold information which, by itself reveals no secrets, could reveal secrets if the third party were to collude and share information with one of the other participants. A more general case relaxes this assumption, so that any participant may fail to follow the protocol and may collude with other parties. This is generally known as a malicious participant. Other common assumptions include the existence of secure channels of communication etc. Secure multiparty computation protocols with malicious participants and secure two party protocols, neither of which can make use of the trick of using a semi-trusted third party tend to be more computationally intensive and involve the use of elements common in public key cryptography. In this sense, the strength of security of the protocols is tied to the strength of the public key system which it is related to. For example, the security of protocols will depend on assumptions related to the difficulty of solving problems such as the discrete logarithm problem or the decision Diffie-Hellmann problem other similar problems underlying the security of public key systems.

We have identified six methods which have been published for secure computation of string comparators. Four of those consider the semi-honest participant case, and two cover a two party case without any assumptions of honesty. String comparators of the form $\Sigma_{i=1}|a|f(a_i, b_i)$, are considered in [8] for arbitrary functions f and for some special cases of f, where $a_i$ and $b_i$ represent the ith characters of strings a and b respectively. Solutions are given for both the semi-honest three party case and the two party case.

The algorithm in [5] is a three party protocol which can be used to securely calculate any n-gram Dice coefficient in the semi-honest case. An example is given for the bigram case. This algorithm is very efficient in the case where all of the strings in one set must be compared to all of the strings in some other set.

In [6], a method is presented for secure computation of the Jaro-Winkler comparator in the semi-honest case. This method was considered impractical by the authors, because of the complexity of the algorithm, and was only included in the work in order to stimulate thought. Probably because of this, the outline of the method appears somewhat hastily written and contains a number of typographical errors and a number of phrases with unclear meaning. Because of this, it is not possible to determine conclusively the steps of the method. In any case, the method is either incorrect, insecure or both.

To see this, we define a binary matrix such that the element in the jth row and kth column of the matrix is a one if and only if the jth character of the first string is common with the kth character in the second string. It appears that, according to the method, the entity calculating the value of the string comparator gains access to a number of tuples of the form (agreementflag, i), where agreementflag is half the value of one of the elements of the matrix and i is somehow related to the row or column index. It appears, due to similarity of notation that i represents either the row or column index, but the meaning of i is not given in the discussion. If i represents only one of the row or column indices, then there is not enough information available to the calculator to obtain either the number of characters in common or the number of transpositions correctly, since both of those depend on the relative order of both sets of characters. If i represents information containing both the row and column indices, then the algorithm divulges much more than the length of each string as claimed. Specifically, the entire binary matrix is learned, from which can be learned, for example, partial information about the Character Group Size Histogram (CGSH) of each of the strings, which we define below.

The modifications to the original Jaro string comparator, such as the one by Winkler, which considers the number of consecutive matching leading characters, and others which consider the effect of approximate matching of characters and adjustments for long strings, are not considered in this work.

In [12], the authors apply a secure approximate inner product protocol to the calculation of two string distance metrics: TFIDF and SoftTFIDF. These are distance metrics which are primarily used for long strings, although they can also be applied to shorter strings. The TFIDF metric consists of the inner product of two vectors, one defined for each string. The vectors, in turn, contain information about the frequency of each sub-string in a string and the frequency of each sub-string in the database of possible strings as a whole. The SoftTFIDF metric is similar to the TFIDF metric, except that it employs some additional metric, which measures the similarity of sub-strings. The authors of [12] claim that they have achieved good results using the SoftTFIDF metric with the Jaro-Winkler metric as the additional metric. The method assumes semi-honest participants in that the secure inner product used is based on a secure cardinality of intersection protocol. The intersection protocol requires a semi-trusted third party when there are only two parties with input, as is the case here.

In [2], a secure protocol is given for the edit distance between two strings. This is a generalization of the Levenshtein edit distance and is given by the minimum cost of transforming one string into another by applying insertions, deletions and substitutions. This work considers the general case where insertion and deletion costs depend arbitrarily on the character deleted or inserted and where substition costs depend arbitrarily on the pair of characters involved in the substitution. The authors also provide somewhat more efficient versions of the algorithm for two special cases. The general algorithm and the special cases all require $O(n^2)$ homomorphic encryptions, where n is an upper bound on the length of both strings involved. The encryptions typically require at least one multiplicative group exponentiation operation (via a square-and-multiply or double-and-add algorithm) per encryption and these operations tend to be computationally very expensive.

The method in [5] is efficient in that it requires only $O(1)$ encryptions for each string. However, it suffers from weaker security in that it assumes semi-honest participants. In addition, the length of the participant's strings is leaked and this information can be important for very long or very short strings.

The method in [12] uses a secure set intersection protocol. The most computationally expensive part of this algorithm is in the encryption of all of the elements in the set, which must be done with some commutative encryption scheme. The complexity of this algorithm is thus $O(s)$ group exponentiations, where s is the number of samples used. In [12], s is quite large, on the order of 10,000. This would be quite time consuming, although a smaller number of samples may be appropriate for shorter strings, such as personal names or surnames on the order of 10 characters. This method appears to be designed for much longer strings. In addition, this method also suffers from the semi-honest requirement.

SUMMARY OF THE INVENTION

It is one object of the present invention to provide an apparatus for securely computing a measure of similarity between two strings of characters from two different databases such that no other significant information can be obtained by either database as a result of the computation.

This measure of similarity can then be compared to a set of fixed threshold values, such that subsequent actions are determined by the minimum threshold value which is exceeded by the measure of similarity.

For example, the set of fixed threshold values could consist of two values, a smaller value and a larger value such that two objects represented by the strings are deemed to be matched if the similarity value exceeds the larger threshold, and such that the strings are deemed to be unmatched if the similarity measure is smaller than the smaller threshold, and such that an uncertain result requiring further investigation is determined if the similarity measure is larger than the smaller threshold and smaller than the larger threshold.

This process can be applied to the task of record linkage, where strings representing two different records in two different databases are compared to determine whether or not they represent the same object.

One example of an application within health surveillance is the elimination of duplicate lab test results. In some cases, more than one lab might report a positive test of some disease for the same patient, in which case it is important to link those two tests so that the number of instances of positive tests is not over-counted. Another example of an application is a case where a positive test for some disease is reported in two different geographic locations. If record linkage can determine that those tests correspond to the same patient, this may be important information for the tracking of the disease. Jurisdictional issues may prevent the sharing of strings such as names and addresses from the databases of two different labs, whereas the computation of similarity of such strings may be allowed in some situations if it can be guaranteed that no other information, other than the value of the string comparator, will be shared.

Another example application involves the search, for security purposes, for names similar to a given name in lists of names of passengers on an aircraft or lists of donors to some organization. The security situation may allow a search for names similar to a given name if there is a guarantee that no information can be gained about names which do not match the given name, whereas the situation may not allow the list itself to be shared.

This apparatus and the measure so calculated can be used in a number of arrangements which allow the transfer and comparison of data between two data bases while maintaining privacy of the data as between the parties as follows:

In one example, preferably the instructions are arranged such that each of two databases contain a string which is unavailable to the other database and to a third database. The instructions executed by each database are preferably arranged in such a way that the third database obtains the value of the bigram-based Dice coefficient applied to the two strings and nothing else, and such that the other databases obtain no additional data about either of the strings. In this example, the instructions are arranged such that no additional data can be obtained by any of the databases if they fail to follow the protocol correctly.

In one example, preferably the instructions are arranged such that each of two databases contain a string which is unavailable to the other database. The instructions executed by each database are preferably arranged in such a way that one of the databases obtains the value of the Jaro=Winkler string comparator applied to the two strings and nothing else, and such that the other database obtains no additional data about either of the strings. In this example, the instructions are arranged such that no additional data can be obtained by either of the parties if they fail to follow the protocol correctly.

In one example, preferably the instructions are arranged such that each of two databases contain a string which is unavailable to the other database and to a third database. The instructions executed by each database are preferably arranged in such a way that the third database obtains the value of the Jaro=Winkler string comparator applied to the two strings and nothing else, and such that the other databases obtain no additional data about either of the strings. In this example, the instructions are arranged such that no additional data can be obtained by any of the databases if they fail to follow the protocol correctly or if two of the databases collude in some way.

According to the present invention there is provided an apparatus for computing a measure of the similarity of two strings of characters, each string being known by only one of a number of participants, in such a way that the information which can be learned about either of the strings by any party is explicitly quantified and limited, the apparatus comprising:

a first participant, and a second participant each participant comprising a computing device equipped with:

a processor for numerical computation;

a memory for storage of data;

an interface for communicating with the computing device of the other two participants;

and a set of stored instructions for executing a series of steps, wherein each step comprises one participant receiving a message from another participant, performing computations with the message to generate data to be stored;

and with other stored data as input, storing the result, and computing and sending a message to another participant;

and a display for displaying the computed measure.

In one example, preferably the set of instructions is arranged such that the first and second participants each determine a matrix unknown to the other, in such a way that neither party can learn anything about the string of the other even if one of the participants fail to follow the outlined procedure, and such that the element-wise exclusive or of the two matrices yields the Identical Character Matrix M1 associated with the pair of the two participants' strings, where the identical character matrix associated with any two strings has the property that the element in the ith row and jth column of the matrix is non-zero if and only if the ith character of the first string is identical to the jth character of the second string.

In one example, preferably the set of instructions is arranged such that each participant generates a binary matrix, with the first participant generating Ma and the second participant generating Mb, with the number of rows equal to at least the number of characters in their respective string, and with the number of columns equal to at least the number of characters in the alphabet from which the characters of their original string are drawn, such that for each character in the original string, there corresponds a row in the matrix with a nonzero element in the column corresponding to the ordinal number within the ordered alphabet from which the original string is drawn, of the character.

In one example, preferably the set of instructions is arranged such that the first participant determines via a series of oblivious transfers, the element-wise exclusive or Ma1 of a random binary matrix Rb generated by the second participant and the matrix product of Ma post-multiplied by the transpose of Mb, and wherein the second participant determines via a series of oblivious transfers, the element-wise exclusive or Mb1 of a random binary matrix Ra generated by the first participant and the matrix product of Ma post-multiplied by the transpose of Mb and wherein each participant determines that the element-wise exclusive or Ma2 of Ma1 and Ra is equal to the element-wise exclusive or Mb2 of Mb1 and Rb.

In the example above, preferably the set of instructions is arranged such that the first participant sends to the second participant, a commitment message committing to the value of Ma2, after which the second participant sends Mb2 to the first participant, after which the first participant verifies that Ma2 is identical to Mb2 and the second participant verifies that value committed to by the first participant is identical to Mb2, and wherein either participant abandons the protocol if their verification fails.

In one example, preferably the set of instructions is arranged such that the first participant determines, with the aid of the second participant, and in such a way that no other information is learned by either participant, a binary matrix which is an element-wise exclusive or of a binary matrix G known only to the second participant and a block diagonal matrix F with three diagonal blocks, one diagonal block being determined and known only to the first participant, another diagonal block being determined and known only to the second participant, and the other diagonal block being a binary matrix encoding all of the information necessary to determine the number of common characters and the number of transpositions in the comparison of some portion of the first participant's string and some portion of the second participant's string.

In one example, preferably the set of instructions is arranged such that the first and second participants each determine a matrix unknown to the other, in such a way that no other information can be learned by either participant, and such that the exclusive or of the two matrices yields a binary matrix F', which is the result of permuting the rows and columns of F by a number of permutations, each permutation of which is known only to one of the participants.

In one example, preferably wherein the set of instructions is arranged such that a series of transactions occur in which, for each transaction, one participant uses oblivious transfer to determine the element-wise exclusive or of a random binary matrix generated by the other participant and the matrix product of a permutation matrix known only to the one participant with a binary matrix known to the other participant.

In the example above, preferably the set of instructions is arranged such that the permutations have that property that they preserve the relative order of all pairs of identical characters within some portion of one of the participants' strings.

In one example, preferably the set of instructions is arranged such that a permutation is determined by one participant, with the aid of the other participant, in such a way that no more than the character group size histogram of the other participant's string can be learned by the one participant, to be such that the relative order of all pairs of identical characters within some string, some portions of which are known to only one of the participants, is left unchanged by application of the permutation to the characters in the string.

In one example, preferably the set of instructions is arranged such that one participant determines a number of transpositions between the participants' strings by computing one half of the number of nonzero elements in an element-wise conjunction of the matrix F' with a row and column permuted version of a binary matrix MU', where MU' has the property that the element in the ith row and jth column of MU' is one if and only if there exists some number k such that i is the kth assigned character from the first participant's string and j is the the kth assigned character from the second participant's string.

In one example, preferably the set of instructions is arranged such that one participant determines, without any party being given an opportunity to learn anything else, the image under a permutation known only to the other participant of the number of consecutive matching initial characters in the first and second participants' strings In one example, preferably the set of instructions is arranged such that the measure of similarity between the two strings is defined so that the computation of its value includes some rounding of the value of a string comparison sufficient to ensure that the mapping from the value of the measure to the subset of the measure's domain which is mapped into that value is a one-to-many mapping.

In one example, preferably the set of instructions is arranged such that the string of one participant includes chaffing characters which are added to the string in such a way as to guarantee that the character group size histogram of the result is also the character group size histogram for some sufficiently large group of strings from some set of strings of interest.

In one example, preferably the set of instructions is arranged such that two participants execute an alternating series of protocols of two types, the first type consisting of a binary search wherein one participant only learns the position of the first differing element between two vectors each of which is known to a different participant, and the second type consisting of a process which eliminates the possibility of obtaining the same result from a future execution of a protocol of the first type.

In the example above, preferably the set of instructions is arranged such that the protocol of the second type is such that it is impossible for one of the participants to eliminate any other possibility from a future execution of a protocol of the first type, other than the one corresponding to the obtained result of the corresponding execution of the protocol of the first type, even if one of the participants fails to follow the protocol correctly.

In one example, preferably the set of instructions is arranged such that the first participant sends a representation of a binary matrix to the second participant to be used in a calculation without divulging the matrix itself by communicating in some form a matrix of random numbers of the same size and shape to the second participant and sending to a third participant a list containing at least all those random numbers which occupy positions which correspond to nonzero elements of the matrix.

In the example above, preferably the set of instructions is arranged such that the list sent to the third participant is padded with random numbers so that the third participant cannot determine the number of nonzero elements in the matrix.

In the example above, preferably the set of instructions is arranged such that the second participant sends to the first participant an encoding of an array of elements from the random matrix such that the ith row and jth column of the array contains the element from the ith row and kth column of the random matrix, where k is the ordinal number of the jth character of the second participants string in the alphabet, if the absolute value of the numerical difference between i and j is less than or equal to some threshold determined by the length of the second participant's string.

In one example, preferably the set of instructions is arranged such that the measure of similarity is a bigram based Dice coefficient and wherein the set of instructions is arranged such that a number of messages are passed between two participants, such that one or more of the messages include representations of one or more elements of an algebraic structure called a group, and such that one or more of the messages include one or more outputs of a function which operates on inputs which include the result of applying a hash function to a pair of representations of elements of the group.

In one example, preferably the set of instructions is arranged such that the first and second participants each determine a primary chaffing string which is appended before or after their original string, such that there exists a specified list of strings, such that each component of the character group size histogram of the resulting primary composite string is not smaller than the corresponding component of the character group size histogram for any string in the list.

In the example above, preferably the set of instructions are arranged such that the list of strings is specified such that each string in the list is assigned a number and the sum of those numbers is at least as large as a given threshold.

In the example above, preferably the set of instructions are arranged such that the number assigned to each string in the list is a measure of its popularity or its frequency of occurrence in a context.

In one example, preferably the set of instructions are arranged such that each participant determines, for their primary chaffing string, a secondary chaffing string which has transpositions and approximate matches with respect to their primary chaffing string, and appends the secondary chaffing string before or after their original string to form a secondary composite string, and appends the secondary composite string before or after their primary composite string to form an extended string, wherein the result of appending the second participant's secondary composite string after the first participant's primary composite string is referred to as the first participant's extended string and the result of appending the second participant's primary composite string to the first participant's secondary composite string is referred to as the second participant's extended string, but these extended strings are never learned by any party.

In one example, preferably the set of instructions are arranged such that the second participant determines, with the aid of the first participant, and in such a way that neither party can learn anything about the primary composite string of the other even if one of the participants fail to follow the outlined procedure, the element-wise exclusive or of the Identical Character Matrix M1 associated with the pair of the two participants' primary composite strings and a random binary matrix of the same size and shape, known only to the first participant, where the identical character matrix associated with any two strings has the property that the element in the ith row and jth column of the matrix is non-zero if and only if the ith character of the first string is identical to the jth character of the second string.

In the above example, preferably the set of instructions are arranged such that each participant generates a binary matrix, with the first participant generating Ma and the second participant generating Mb, with the number of rows equal to at least the number of characters in their respective primary composite string, and with the number of columns equal to at least the number of characters in the alphabet from which the characters of their original string are drawn, such that for each character in the original string, there corresponds a row in the matrix with a nonzero element in the column corresponding to the ordinal number within the ordered alphabet from which the original string is drawn, of the character In the above two examples, preferably the set of instructions are arranged such that the first participant determines via a series of oblivious transfers, the element-wise exclusive or Ma1 of a random binary matrix Rb generated by the second participant and the matrix product of Ma post-multiplied by the transpose of Mb, and wherein the second participant determines via a series of oblivious transfers, the element-wise exclusive or Mb1 of a random binary matrix Ra generated by the first participant and the matrix product of Ma post-multiplied by the transpose of Mb and wherein each participant determines that the element-wise exclusive or Ma2 of Ma1 and Ra is equal to the element-wise exclusive or Mb2 of Mb1 and Rb.

In the example above, preferably the set of instructions are arranged such that the first participant sends to the second participant, a commitment message committing to the value of Ma2, after which the second participant sends Mb2 to the first participant, after which the first participant verifies that Ma2 is identical to Mb2 and the second participant verifies that value committed to by the first participant is identical to Mb2, and wherein either participant abandons the protocol if their verification fails.

In one example, preferably the set of instructions are arranged such that the first participant determines, with the aid of the second participant, and in such a way that no other information is learned by either participant, a binary matrix which is an element-wise exclusive or of a binary matrix G known only to the second participant and a block diagonal matrix F with three diagonal blocks, one diagonal block being determined and known only to the first participant, another diagonal block being determined and known only to the second participant, and the other diagonal block being a binary matrix encoding all of the information necessary to determine the number of common characters and the number of transpositions in the comparison of the first participant's original string and the second participant's original string.

In the example above, preferably the set of instructions are arranged such that each of the diagonal blocks determined by the first and second participant contain information sufficient to determine the number of common characters and transpositions in a comparison between the primary and secondary chaffing strings of the first or second participant respectively.

In one example, preferably the set of instructions are arranged such that the third participant, determines, with the aid of the first and second participants, and in such a way that no other information can be learned by any participant, a binary matrix F', which is the result of permuting the rows of F, first by a permutation PA known only to the first participant and subsequently by a permutation QB, known only to the second participant, and then subsequently permuting the columns of the resulting matrix, first by a permutation PB known only to the second participant and subsequently by a permutation QA known only to the first participant.

In the example above, preferably the set of instructions are arranged such that a series of transactions occur in which, for each transaction, one participant uses oblivious transfer to determine the element-wise exclusive or of a random binary matrix generated by the other participant and the matrix product of a permutation matrix known only to the one participant with a binary matrix known to the other participant.

The In the example above, preferably the set of instructions are arranged such that PA is a permutation of the first participant's extended string with the property that it preserves the relative order of all pairs of identical characters within her primary composite string and within the second participant's secondary composite string, and wherein PB is a permutation of the second participant's extended string with the property that it preserves the relative order of all pairs of identical characters within his primary composite string and within the first participant's secondary composite string.

The In the example above, preferably the set of instructions are arranged such that the permutation QA is determined by the first participant, with the aid of the second participant, in such a way that no more than the character group size histogram of the second participants primary composite string can be learned by the first participant, to be such that the relative order of all pairs of identical characters within the first participants secondary composite string and within the second participants primary composite string remain unchanged if the second participant's extended string is first permuted according to PB and subsequently, according to the permutation QA to yield the second participants permuted extended string, and wherein the permutation QB is determined by the second participant, with the aid of the first participant, in such a way that no more than the character group size histogram of the first participant's primary composite string can be learned by the second participant, to be such that the relative order of all pairs of identical characters within the second participant's secondary composite string and within the first participant's primary composite string remain unchanged if the first participant's extended string is first permuted according to PB and subsequently, according to QA to yield the first participants permuted extended string.

In one example, preferably the set of instructions are arranged such that the third participant determines a number of transpositions between the first and second participant's extended strings by computing one half of the number of nonzero elements in an element-wise conjunction of the matrix F' with a binary matrix MU', where MU' has the property that the element in the ith row and jth column of MU' is one if and only if i is the image under successive permutations by PA and QB of an index of a character from the first participant's extended string which would be assigned in a comparison between the first and second participant's extended strings and j is the image under successive permutations by PB and QA of an index of a character from the second participant's extended string which would be assigned in a comparison between the first and second participant's extended strings, and there exists some number k such that i is the image of the index of the kth assigned character from the first participant's extended string in a comparison between the two participant's extended string under successive permutation by PA and QB and j is the image of the kth assigned character from the second participant's extended string in a comparison between the two participant's extended strings, under successive permutation by PB and QA.

In the example above, preferably the set of instructions are arranged such that the matrix MU' is determined according to the rule that the element in the ith row and jth column of MU' is equal to one if and only if the ith component of a vector X' and the jth component of the vector Y' are both equal to one, where X' and Y' are defined to be binary vectors the kth component of which is, for any appropriate k, equal to one if and only if the kth character of the first or second participant's extended string respectively is assigned in a comparison between those two strings, and the ith component of the vector P' is equal to the jth component of the binary vector Q', where P' is equal to the compound product of matrices defined by $P'=QB*PA*L*PA*QB*X$ and where Q' is equal to the compound product of matrices defined by $Q'=QA*PB*L*PB*QA*Y'$, where PA,PB,QA and QB represent a matrix representations of the permutation with the same labels respectively and where '*' denotes matrix multiplication, and where L is a binary matrix with ones everywhere on and below the main diagonal and zeros everywhere else.

In the example above, preferably the set of instructions are arranged such that a series of transactions occur in which, for each transaction, one participant uses oblivious transfer to determine the sum of a random vector generated by the other participant and the product of a binary matrix with row sums bounded by one, known only to the one participant with a vector known only to the other participant.

In one example, preferably the set of instructions are arranged such that the third participant determines the number of approximate matches from the matrix FA" which is determined by determining the compound binary matrix product
FA"=SB*RA*Xbar*QB*PA*FA*PB*QA*Ybar*RB*SA,
where: FA is a binary matrix such that the element in the ith row and jth column of FA is one if and only if the ith character of the first participant's extended string is an approximate match for the jth character of the second participant's extended string; PA,PB,QA and QB are matrix representations of the permutations with the same labels; RA,RB,SA and SB are matrix representations of permutations which are different from but obtained according to the same method as PA,PB,QA and QB respectively; Xbar is a diagonal binary matrix such that the ith element of the diagonal is one if and only if the ith character of the first participant's extended string is not assigned in a comparison with the second participant's extended string; and Ybar is a diagonal binary matrix such that the jth element of the diagonal is one if and only if the jth character of the second participant's extended string is not assigned in a comparison with the first participant's extended string.

In the example above, preferably the set of instructions are arranged such that the third participant determines FA" via a series of transactions, such that, in each transaction, one party uses oblivious transfer to learn the element-wise exclusive or of a random binary matrix known only to the other participant and the matrix product of a binary matrix known only to the one participant with a binary matrix known only to the other participant.

In one example, preferably the set of instructions are arranged such that the first and second participants generate random permutations U and V respectively, of the integers between zero and an integer n, and wherein the first participant determines, without any party being given an opportunity to learn anything else, the ith element vi of V, where i is the number of consecutive matching initial characters in the first and second participants' original strings, and wherein the second participant determines, without any party being given an opportunity to learn anything else, the ith element ui of U.

In the example above, preferably the set of instructions are arranged such that the method includes a number of steps in which a receiver participant chooses from a sender participant, via oblivious transfer, out of a list of objects constructed by the sender: one for each character in the alphabet from which the participant's original strings are chosen, the object in the list in the position with ordinal number corresponding to the ordinal number of the position in the alphabet of one of the characters in the first n characters of the receiver's original string.

In the example above, preferably the set of instructions are arranged such that each object is itself a list of sub-objects, and wherein each sub-object consists of a pair of elements from a cyclic group which be considered, without loss of generality, as an additive group, and wherein each object in the list of objects constructed by the sender is the same as every other object in the list, except for one special object, whose position in the list corresponds to the ordinal number of one of the first n characters in the sender's original string.

In the example above, preferably the set of instructions are arranged such that all sub-objects in the list comprising any object other than the special object are different re-encodings of the first sub-object in the object chosen by the constructor during the most recent previous step in which the constructor played the role of receiver, and wherein the special object is constructed from the object chosen by the constructor during the most recent previous step in which the constructor played the role of receiver and wherein the special object is constructed by eliminating the first sub-object in the chosen object and re-encoding the other sub-objects.

In the example above, preferably the set of instructions are arranged such that, near the end of the algorithm, a sending participant holds in storage n objects such that the ith object is special in that it has a certain property which can be verified by a receiving participant, and wherein the sending participant permutes the n objects according to U or V respectively if the sending participant is the first or second participant, so that the other participant will recognize as special the uith or vith object respectively, and wherein the receiving participant will determine ui or vi respectively to be the index in the list of objects received which is determined to be special.

In one example, preferably the set of instructions are arranged such that the third participant determines, using her knowledge of the total number of exact matches, the total number of approximate matches and the total number of transpositions, with the aid of the first participant who uses her knowledge of her number of fake exact matches, her number of fake approximate matches, her number of fake transpositions and U and v, and with the aid of the second participant who uses his knowledge of his number of fake exact matches, his number of fake approximate matches, his number of fake transpositions and u and V, and in such a way that no participant can learn anything else whether they follow the protocol correctly or not, the value f of some function of the total number of exact matches, the total number of approximate matches, the total number of transpositions, both participants' numbers of fake exact matches, both participants' number of fake approximate matches, both participants' number of fake transpositions and the number of consecutive matching characters in the participants' original strings In the example above, preferably the set of instructions are arranged such that the function ƒ is defined so that the computation of its value includes some rounding of the value of the string comparison sufficient to ensure that the mapping from the value of f to the subset of f's domain which is mapped into that value is a one-to-many mapping.

In the example above, preferably the set of instructions are arranged such that the three participants each generate a different non-singular operator which maps the range of the function to itself, such that all three operators commute with one another.

In the example above, preferably wherein the set of instructions are arranged such that each of the three participants construct, with each individual using only quantities known to themselves, two vectors of integers such that all six vectors are of the same length, and each of the first two participants constructing a function which maps integer vectors of that length into the range of the function, such that the result of applying the first participant's function to the sum, modulo some integer L, of all three participants' first vectors, and the result of applying the second participant's function to the sum, modulo L, of all three participants' second vectors, both yield the result f.

In the example above, preferably set of instructions are arranged such that the first participant securely determines the result of applying all three operators to the value of the second participant's function evaluated at the sum, modulo L, of the second vector of all three parties and wherein the second participant securely determines the result of applying all three operators to the value of the first participant's function evaluated at the sum, modulo L, of the first vector of all three parties, and wherein the participants determine securely that the values they each obtained are the same and abort the protocol if they are not.

In one example, preferably the set of instructions are arranged such that the measure of similarity of two strings is the Jaro-Winkler string comparator with or without any number of the modifications.

In one example, preferably the set of instructions are arranged such that the protocol is carried out in a way such that no participant can gain any more significant information by colluding with another participant and/or failing to follow the protocol correctly.

In one example, preferably the set of instructions are arranged such that the measure of similarity of two strings is the bigram based Dice Coefficient.

In one example, preferably the set of instructions are arranged such that the protocol is carried out in such a way that requires semi-honest or curious but honest participants, who will follow the protocol correctly.

In one example, preferably the set of instructions are arranged such that the measure of similarity of two strings is the bigram based Dice Coefficient and wherein the set of instructions are arranged such that the protocol is carried out in a way such that no participant can gain any more significant information by colluding with another participant and/or failing to follow the protocol correctly.

In one example, preferably the set of instructions are arranged such that the measure of similarity of two strings is the Jaro-Winkler string comparator with or without any number of the modifications and wherein the set of instructions are arranged such that the protocol is carried out in such a way that requires semi-honest or curious but honest participants, who will follow the protocol correctly.

In the example above, preferably the set of instructions are arranged such that the third participant determines, with the aid of the first two participants a permuted version of a block diagonal binary matrix Z', such that one diagonal block is determined and known only to the first participant, one diagonal block is determined and known only to the second participant, and one diagonal block has the property that the element in the ith row and jth column of the block is non-zero if and only if the ith character in the first participant's padded string is identical to the jth character in the second participant's padded string and the absolute value of the numerical difference between i and j is less than or equal to one less than one half of the larger of the length of the two participants original unpadded strings.

In the example above, preferably the set of instructions are arranged such that a first participant sends a representation of a binary matrix to a second participant to be used in a calculation without divulging the matrix itself by communicating in some form a matrix of random numbers of the same size and shape to the second participant and sending to a third participant a list containing at least all those random numbers which occupy positions which correspond to nonzero elements of the matrix.

In the example above, preferably the set of instructions are arranged such that the list sent to the third participant is padded with random numbers so that the third participant cannot determine the number of nonzero elements in the matrix.

In the example above, preferably the set of instructions are arranged such that the second participant performs a calculation on the matrix by sending to the first participant an encoding of an array of elements from the random matrix such that the choice of elements is determined by the second participant's string and by the form of the diagonal block determined and known only to the second participant.

In the example above, preferably the set of instructions are arranged such that the second participant places in the ith row and jth column of the array, the element from the ith row and kth column of the random matrix, where k is the ordinal number of the jth character of the second participants string in the alphabet, if the absolute value of the numerical difference between i and j is less than or equal to some threshold determined by the length of the second participant's string.

In the example above, preferably the set of instructions are arranged such that the encoding of the array is such that the third participant can decode the representation but the first participant cannot.

In the example above, preferably the set of instructions are arranged such that the permuted version of the matrix is obtained from the un-permuted version by a permutation of the rows by a permutation known only to the first participant and a permutation of the columns by a permutation known only to the second participant.

DETAILED DESCRIPTION

In the following, there is disclosure of a three party protocol for computing the Jaro-Winkler string comparator in the case of semi-honest participants. This provides a correct method for addressing the problem considered in [6]. There is also disclosure of a three party protocol for computing the bigram based Dice coefficient string comparator, which does not require any assumptions of honesty, so that collusion and cheating of any sort is allowed. The complexity of the computation is dominated by O(n) group exponentiations, which is significantly more efficient than the edit distance method in [2]. Our protocol also does not leak the length of either string. In addition, we develop a two party protocol for computing the Jaro-Winkler string comparator which does not require any assumptions of honesty, so that cheating of any sort is allowed. The complexity of the computation is dominated by O(n log(n)) group exponentiations, which is significantly more efficient than the edit distance method in [2]. This protocol also does not leak the length of either string, and we use chaffing to ensure that the information which is leaked is innocuous.

The Dice Coefficient

The Dice coefficient is a string comparator which provides a measure of the similarity of two strings. It is based on a comparison of the bigrams which occur in each string. A bigram is an ordered pair of characters which appear in adjacent positions in a string. Thus, for example, the string 'peter' contains the bigrams (p, e),(e, t),(t, e) and (e, r). If we define $$\mathrm{bigram}(x) = \bigcup_{i=1}^{|x|} (x_i, x_{i+1})$$

where $x_i$ denotes the ith character in x, as the set of bigrams present in any string x of length |x| then the dice coefficient for two strings, say a and b, is given by $$\text{Dice}(a, b) = 2 \frac{|\text{bigram}(a) \cap \text{bigram}(b)|}{|\text{bigram}(a)| + |\text{bigram}(b)|}$$

The following algorithm provides a method whereby, if two participants, Alice and Bob, posess two different strings say a and b, a third party, Carol, can determine Dice(a, b) without learning anything else about a or b, even if she is colluding with either Alice or Bob.

For the encryption scheme in Protocol, we used elliptic point groups for our implementation.

---
Protocol 1
Blind Dice Coefficient Calculation - Part One
---

Inputs: Alice has a string a and Bob has a string b, both constructed from an alphabet $\alpha = \{a_k | k \in [1, N]\}$ with N characters (so that $a_i \in [1, N]$ for each $i \in [1, |\alpha|]$). Both have a generator G and M ($\geq$ L, (N + 1)) elements $C_1, C_2, \ldots, C_M$ of an additive group of order r for which division (i.e. analog of discrete logarithm in a multiplicative group) is difficult to compute. Both also have an integer L such that |a|, |b| $\leq$ L and an integer d.

Outputs: Carol learns rep(Dice(a, b), d), where rep(x, d) denotes some d-bit representation of the real number x.

1: Assume that the set of bigrams in a is given by $$\text{bigram (a)} = \bigcup_{i=1}^{|\text{bigram}(a)|} (c_i, d_i).$$

Alice creates an (L − 1) × 2 matrix A such that the ith row of A is given by $(c_i, d_i)$ if $i \leq |\text{bigram}(a)|$ and given by (N + 1, N + 1) otherwise. For each $i \in [1, L − 1]$, Alice generates two random integers $x_i, y_i \in [1, r]$ and sends $X_i = C_{A_{i1}} − x_i G$ and $Y_i = C_{A_{i2}} − y_i G$ to Bob.

2: Bob generates a random integer h and sends hG to Alice.

3: Bob generates L − 1 random integers $z_i \in [0, L − 1]$.

$$\text{Let } z = \sum_{i=1}^{L-1} z_i.$$

For each $i \in [1, L − 1]$, $j, k \in [1, N + 1]$, Bob generates $Z_{ijk}$ = hash(h($C_j − X_i$), h($C_k − Y_i$)) $\oplus$ ($z_i$ + element((j, k), bigram(b))), where hash(x, y) represents a hash function operating on the tuple (x, y) and element(x, y) = 1 if $x \in y$ and element(x, y) = 0 otherwise. We also define element((N + 1, N + 1), bigram(b)) = 0. Bob sends all of the $Z_{ijk}$ to Alice.

4: For each $i \in [1, L − 1]$, Alice calculates $$s = \sum_{i=1}^{L-1} Z_{iA_{i1}A_{i2}} \oplus \text{hash } (x_i hG, y_i hG)$$

$$\mod L = \sum_{i=1}^{L-1} z_i + \sum_{i=1}^{|\text{bigram}(a)|} \text{element } ((c_i, d_i), \text{bigram}(b))$$

mod L = |bigram(a) $\cap$ brgram(b)| + z mod L.

5: Continued in part 2 below

---
Protocol 2
Blind Dice Coefficient Calculation - Part Two
---

6: Alice generates two random integers $p_a, q_a \in [0, r]$ and sends $Y_{1a} = C_s − p_a G$ and $Y_{2a} = C_{|\text{bigram}(a)|} − q_a G$ to Bob.

7: Bob generates a random bitstring $l_b$ of length d. For each $i, j \in [0, L]$, Bob computes $Z_{ij} =$ $$\text{hash}(h(C_i − Y_1), h(C_j − Y_2)) \oplus \text{rep}\left(2 \frac{(i - z) \bmod L}{j + |\text{bigram}(b)|}, d\right) \oplus l_b,$$

---
Protocol 2
Blind Dice Coefficient Calculation - Part Two
--- and sends this to Alice.

8: Alice generates a random bitstring $l_a$ of length d, and calculates A = $Z_{s|\text{bigram}(a)|} \oplus \text{hash}(hp_a G, hq_a G) \oplus l_a = \text{rep}(\text{Dice}(a, b), d) \oplus l_a \oplus l_b$.

9: Bob generates two random integers $p_b, q_b \in [0, r]$ and sends $Y_{1b} = C_z − p_b G$ and $Y_{2b} = C_{|\text{bigram}(b)|} − q_b G$ to Alice.

10: For each $i, j, \in [0, L]$, Alice computes $Z_{ij} = \text{hash}(h(C_i − Y_1), h(C_j − Y_2)) \oplus \text{rep}\left(2 \frac{(s - i) \bmod L}{j + |\text{bigram}(a)|}, d\right) \oplus l_a,$ and sends this to Bob.

11: Bob calculates B = $Z_{z|\text{bigram}(b)|} \oplus \text{hash}(hp_b G, hq_b G) \oplus l_b = \text{rep}(\text{Dice}(a, b), d) \oplus l_a \oplus l_b$.

12: Bob generates a random encryption/decryption key $k_b$, and sends E(B, $k_b$) to Alice, where E(x, k) represents encryption with key k. The encryption must be such that, given some message x and ciphertext y, it is difficult to find a key k such that E(x, k) = y.

13: Alice generates a random encryption/decryption key $k_a$, and sends E(A, $k_a$) to Bob.

14: Alice sends $k_a$ to Bob, and Bob sends $k_b$ to Alice, after they have both received the encrypted message from the previous two steps.

15: Alice and Bob decrypt each others messages, to verify that the two original (unencrypted) messages were identical. If they are not, the algorithm aborts.

16: Alice and Bob send A' = A $\oplus l_a$ and $l_b$, respectively to Carol.

17: Carol computes rep(Dice(a, b), d) = A' $\oplus l_b$.

The encryption and decryption keys are the same: a random 128 bit number, and E(m, k)=k*point_on_curve(m), where * is elliptic point multiplication and point_on_curve( ) is a function that takes an integer and finds a corresponding point on the elliptic curve. Decryption is simply D(m, k)=inv_point_on_curve(inv(k)*m) where inv_point_on_curve takes the curve point and returns the original message (essentially this just takes the x value and discards some least significant bits) and inv(k) is the inverse of k.

The Jaro-Winkler String Comparator

The official string comparator used in the 1995 test census in the United States is known generally as the Jaro-Winkler string comparator. Code written in the C language, for a function implementing this string comparator can be obtained from the U.S. Census Bureau at http://www.census.gov/geo/msb/stand/strcmp.c. The function takes two strings as input, and returns a double precision value from 0.0 (representing total disagreement of the strings) to 1.0 (representing character-by-character agreement of the strings). The returned value is a measure of the similarity of the two strings. The function was written using the logic from code written by Bill Winkler, George McLaughlin and Matt Jaro with modifications by Maureen Lynch.

The string comparator implemented uses the method outlined in [13], including the modification proposed in that document, with two additional modifications, one which adjusts for similarities in non-matched characters, and another which adjusts the value of the comparator for long strings. The first modification is used to give partial credit for characters that may be errors due to known phonetic or character recognition errors. A typical example is to match the letter "O" with the number "0". We will use the terms "exact match" and "approximate match" to refer to characters which are respectively identical or similar in this sense. A list of similar characters can be found in the C language code at http://www.census.gov/geo/msb/stand/strcmp.c from the US census bureau for the Jaro-Winkler string comparator. The second modification, outlined in [13] modifies the basic string comparator according to whether the first few characters in the string agree. The third modification adjusts the value of the comparator for long strings.

The basic string comparator is given by $$\Phi(a, b) = c(a, b)\left(\frac{W_1}{|a|} + \frac{W_2}{|b|}\right) + W_t\left(1 - \frac{\tau(a, b)}{c(a, b)}\right) \quad (1)$$

where a and b are the two strings being compared, |x| denotes the length of a string, c(a, b) denotes the number of characters in common in the pair of strings and r(a, b) denotes the number of transpositions of characters. Let $x_i$ denote the ith character in any string x. Then $a_i$ and $b_j$ are said to be in common if $a_i = b_j$ and $|i-j| \leq d = \max(|a|, |b|)/2 - 1$, so that they are no further apart than d characters. In fact, this does not quite serve as a definition for c(a, b), since it does not specify which pairs of common characters are to be chosen, when one character is found to be in common with a number of others. However, in the implementation at http://www.census.gov/geo/msb/stand/strcmp.c, which was used for the 1995 census, each character in a is considered in the order in which they appear, and is matched to the first character in b which is in common with it. Any character from one string which is matched to a character from the other string is said to be "assigned". For any pair of strings x and y, define assigned$_x$(y) to be the ordered set of positions i in the string y such that the ith character of y is assigned in a comparison of y with x. Then r(a, b) can be expressed as $$\tau(a, b) = \frac{1}{2} \sum_{j=1}^{|assigned_a(b)|} \left(1 - \delta_{b_{[assigned_a(b)]_j}, a_{[assigned_b(a)]_j}}\right) \quad (2)$$

where δ is the Kroenecker delta ($\delta_{ij} = 1$ iff i=j). Generally the weights $W_1$, $W_2$ and $W_t$ are all set to ⅓.

The first modification is given by $$\Phi_1(a, b) = \Phi(a, b) + .3s(a, b)\left(\frac{W_1}{|a|} + \frac{W_2}{|b|}\right) \quad (3)$$

where s(a, b) denotes the number of approximate matches (similar characters) in the two strings. Note that, according to the U.S. census bureau C code for the string comparator, a pair of characters are considered similar only if neither of them is assigned.

The second modification is given by $$\Phi_2 = \begin{cases} \Phi_1 & \text{if } \Phi_1 \leq 0.7 \\ \Phi_1 + .1i(a, b)(1 - \Phi_1) & \text{otherwise} \end{cases} \quad (4)$$

where i(a, b)∈[0, 4] represents the number of consecutive matching characters in the first four initial characters of the strings. The third modification is given by $$\Phi_3 = \begin{cases} \Phi_2 + (1 - \Phi_2)\frac{c - i - 1}{|a| + |b| - 2i + 2} & \text{if } \Phi_1 > .7, c > i + 1 \text{ and} \\ & 4 < \min(|a|, |b|) < 2c - i \\ \Phi_2 & \text{otherwise} \end{cases} \quad (5)$$

where we have omitted the explicit dependence of c and i on a and b for brevity.

This document considers a situation where two participants, Alice and Bob, each have a string.

In the three party protocol, a third participant, Carol, wishes to determine the value of the string comparator for the two strings. Alice and Bob are willing to allow Carol to determine the value of the string comparator, but want to avoid leaking any other information about their strings to other participants. In this case, we assume that the participants are semi-honest, meaning that they will follow the protocol, but will try to learn anything they can from the information that they receive. We assume that no two participants collude in order to gain information from the third. This allows us to develop a more efficient algorithm than otherwise possible, since it is possible, for example, for Bob to provide one set of data each to Alice and Carol, such that the information in each data set is itself innocuous, whereas the combination may reveal sensitive information.

In the two party protocol, Carol plays no role. Alice will determine the value of the string comparator for the two strings. Bob is willing to allow Alice to determine the value of the string comparator, but wants to avoid leaking any other information about his string. Alice also does not wish to divulge anything about her string to Bob. Alice and Bob do not trust each other to follow the rules. They both assume that the other may cheat to obtain information about their string. We outline a method whereby Alice can obtain the value of the string comparator in such a way that the amount of information that could be leaked about either of the strings can be restricted to rather innocuous information.

Detailed Description of Two Party Jaro-Winkler Protocol

In this section, we provide a detailed description of the two party protocol which calculates the Jaro-Winkler string comparator in the case where the two parties do not trust each other to follow the protocol. Some of this material will be identical to that for the three party protocol, which we will describe later in this document, but we will split the description between those two cases here, in the interest of clarity.

Two Party Protocol: Determining Common Characters (Exact Matches)

Suppose that Alice has string a and Bob has string b. In order to evaluate the Jaro-Winkler string comparator on this pair of strings, the first step requires determination of the number of characters in common in a and b.

For any two strings x and y we define the |x|×|j| exact match matrix E(x, y) such that $$E(x, y)_{ij} = \begin{cases} 1 & \text{if } x_i = y_j \\ 0 & \text{otherwise} \end{cases} \quad (6)$$

Also for any three positive integers m,n and r, we define the m×n range matrix R(m, n, r) such that $$R(m, n, r)_{ij} = \begin{cases} 1 & \text{if } |i - j| \leq r \\ 0 & \text{otherwise} \end{cases} \quad (7)$$

R(m, n, r) has a diagonal band of maximum width 2r+1. Let α represent the ordered alphabet of possible characters for a and b.

Then, we can determine which characters from the string a are in common with which characters in b if we can obtain the matrix $$E(a,b) \wedge R(|a|,|b|,d(|a|,|b|))$$

where $\wedge$ represents elementwise conjunction and $d(x, y) = \frac{1}{2} \max\{|x|, |y|\} - 1$.

We do not, however, want Alice or Bob to reveal $|a|$ or $|b|$ to the other, since that would, in some cases, provide information about the strings. For example, if the strings represent surnames from a list of American surnames at http://www.census.gov/geneology/names/ obtained from a United States census, and one of the strings is very short or very long, say 13 characters or more, then knowing the length of the string would allow one to compile a short list of possible surnames which very likely contains the name. In order to hide the length of strings a and b, we will need to pad them in some way.

Instead of comparing the string a to the string b, we compare the string aa' to the string bb', where a' is a padding string generated by Alice to hide the length of a and b' is a padding string generated by Bob to hide the length of b.

If we were to compare aa' to bb' it is possible that we might obtain matches between characters in a and b', or between characters in a' and b' etc., so that the number of characters in common between aa' and bb' is not the same as the number of common characters between a and b. In order to address this, we choose a' and b' from alphabets α' and β' which have no characters in common with each other or with a or b. Then we have $$E(aa', bb') = \begin{bmatrix} E(a, b) & 0 \\ 0 & 0 \end{bmatrix}. \quad (8)$$

In order to calculate the number of common characters (exact matches), Alice and Bob must construct the matrix $$E(aa', bb') \wedge R(|aa'|, |bb'|, d(|a|, |b|)) = \quad (9)$$

$$\begin{bmatrix} E(a, b) \wedge R(|a|, |b|, d(|a|, |b|)) & 0 \\ 0 & 0_{|a'| \times |b'|} \end{bmatrix}$$

where $0_{m \times n}$ represents an m×n zero matrix, for any positive integers m and n. Let $\alpha = \{\alpha_i | i \in [1, |\alpha|]\}$ represent the alphabet of possible characters for a and b. Also let $L_a = |aa'|$ and $L_b = |bb'|$. To obtain the matrix F, we first define the $L_a \times |\alpha|$ matrix $M_a$ and the $L_b \times |\alpha|$ matrix $M_b$ according to $$[M_a]_{ij} = \begin{cases} 1 & \text{if } i \leq |a| \text{ and } a_i = \alpha_j \\ 0 & \text{otherwise} \end{cases} \quad (10)$$

$$[M_b]_{ij} = \begin{cases} 1 & \text{if } i \leq |b| \text{ and } b_i = \alpha_j \\ 0 & \text{otherwise} \end{cases} \quad (11)$$

Then we have $$E(aa',bb') \wedge R(|aa'|,|bb'|,d(|a|,|b|)) = [M_a M_b^T] \wedge [R(L_a, L_b, d)]. \quad (12)$$

Alice first determines the matrix $M_a M_b^T \oplus B'$, where B' is a random binary matrix generated by Bob, by employing Protocol 3, with $A = M_a$ and $B = M_b^T$.

The next order of business, once we have determined $M_a M_b^T$ (up to the addition of the random matrix B'), is to obtain $M_a M_b^T \wedge R(L_a, L_b, d(|a|, |b|))$ (also up to the addition of a random matrix B). We can do this using oblivious transfer as in Protocol 4 and 6 below. For ease of notation we denote $R(L_a, L_b, d(|a|, |b|))$ simply by $R(d)$.

---

Protocol 3 Choice of Matrix Rows

Inputs: Alice has an m × n binary matrix A such that $Ae \leq e$, where e is a column vector of 1s.
  Bob has an n × l binary matrix B and a randomly generated m × l binary matrix B'.
Outputs: Alice learns $AB \oplus B'$
  1: For each i = 1, 2, ..., m, Bob calculates the matrix $B^{(i)} = B \oplus eB_i'$ and the row vector $b^{(i)} = B_i'$, where $B_i'$ denotes the ith row of B'.
  2: Since $Ae \leq e$, for each $i \in [1,m]$, either $[Ae]_i = 0$ or $[Ae]_i = 1$ and there is exactly one integer $k_i \in [1,n]$ such that $A_{ik_i} = 1$ and $A_{ij} = 0$ for all $j \neq k_i$. For each i = 1, 2, ..., m, Alice uses 1 out of n + 1 oblivious transfer to obtain $b^i$ (if $[Ae]_i = 0$), or the $k_i$th row of $B^i$ (if $[Ae]_i = 1$), and sets the ith row of her result to this value.

---

Protocol 4 Range matrix: Alice

Inputs: Alice has string a. Bob has string b, and binary matrices B and B'. Alice and Bob both have integers $L_a$ and $L_b$.
Outputs: Alice learns $(B \wedge R(d)) \oplus B'$.
  1: Bob generates a series of matrices $\{X^i | i \in [1, \max\{L_b, L_a\}]\}$ such that $X^i = (B \wedge R(\frac{1}{2}|b| - 1)) \oplus B'$ for $i \in [1, |b|]$ and $X^i = (B \wedge R(\frac{1}{2} - 1)) \oplus B'$ for $i > |b|$.
  2: Alice uses 1-out-of-N oblivious transfer, with $N = \max\{L_a, L_b\}$, to obtain $X^{|a|} = (B \wedge R(d)) \oplus B'$.

---

Protocol 5 Range matrix: Bob

Inputs: Bob has string b. Alice has string a, and binary matrices A and A'. Alice and Bob both have integers $L_a$ and $L_b$.
Outputs: Bob learns $(A \wedge R(d)) \oplus A'$.
  1: Alice generates a series of matrices $\{X^i | i \in [1, \max\{L_b, L_a\}]\}$ such that $X^i = (A \wedge R(\frac{1}{2}|a| - 1)) \oplus A'$ for $i \in [1, |a|]$ and $X^i = (A \wedge R(\frac{1}{2} - 1)) \oplus A'$ for $i > |a|$.
  2: Bob uses 1-out-of-N oblivious transfer, with $N = \max\{L_a, L_b\}$, to obtain $X^{|b|} = (A \wedge R(d)) \oplus A'$.

---

Protocol 6 Common Character Matrix

Inputs: Bob has the the string b and binary matrices B' and B. Alice has the string a and the binary matrix $M_a M_b^T \oplus B'$.
Outputs: Alice learns $(M_a M_b^T \wedge R(d)) \oplus B$.
  1: Alice generates a random binary matrix E. Bob generates a random binary matrix F.
  2: Bob uses protocol 4 to obtain $X = ((M_a M_b^T \oplus B') \wedge R(d)) \oplus E$.
  3: Alice uses protocol 5 to obtain $Y = (B' \wedge R(d)) \oplus F$
  4: Bob sends $Z = X \oplus F \oplus B$ to Alice.
  5: Alice calculates $Y \oplus Z \oplus E = (M_a M_b^T \wedge R(d)) \oplus B$

---

Two Party Protocol: Chaffing

Ideally, the string comparator would be evaluated in such a way that no other information is obtained. In practice, it would be very difficult to construct an algorithm in which one party could determine the value of the string comparator without learning at least something about the inputs into the calculation, such as the number of exact matches, transpositions and approximate matches. Bob can, however mask the value of these somewhat, by introducing some fake exact matches, transpositions and approximate matches, so that Alice can only learn an upper bound on these quantities and not their exact value. We refer to this process as chaffing. Since these upper bounds can be made relatively large if necessary by using large chaffing strings, and since these quantities contain only very indirect information about the strings themselves, we consider this leak of information to be relatively innocuous.

In order to do this, Bob introduces a string b″ which contains exact matches, transpositions and approximate matches when compared with b′ and the algorithm proceeds in such a way that the numbers of these are added to the result of Alice's calculation for the number of exact matches, transpositions and approximate matches respectively. The algorithm compares the string $x=aa'b_0b''$ to the string $y=bb'$, where $b_0$ is a string of the same length as b with no characters in common or similar to any characters in a,b,a′,b′ or b″.

Bob can add any desired number of exact matches, approximate matches and transpositions to the calculation by manipulating c(b″, b′), s(b″, b′) and r(b″, b′) via his choice of b′ and b″. In the last stage, when calculating the value of the string comparator, Alice and Bob will subtract these values to obtain the correct value of the string comparator.

In this process, Alice and Bob will construct the matrix $$F = \begin{bmatrix} E(aa', bb') \wedge R(d) \\ H \end{bmatrix} \quad (13)$$

where $$H = \begin{bmatrix} 0_{|b| \times |b|} & 0 \\ 0 & E(b'', b') \end{bmatrix}$$

If we assume that F has the property that $F_{ij}=1$ if and only if $x_i=y_j$ and $|i-j| \leq d = \max(|x|,|y|)/2-1$, and use it to calculate the number of common characters c(x, y), we will obtain c′(x, y)=c(a, b)++c(b″, b′). In fact c(x, y)≠c′(x, y) in general, since matching characters in b′ and b″ may be shifted out of range of each other when we construct and compare $x=aa'b_0b''$ to $y=bb'$ instead of simply comparing b″ to b′. However it is actually c′(x, y) that we are interested in, and so our protocol proceeds by constructing F and then using it as if it did actually have the property ($F_{ij}=1$ if and only if $x_i=y_j$ and $|i-j| \leq d = \max(|x|,|y|)/2-1$) when we calculate the number of exact matches. In so doing, we obtain c′(x, y)=c(a, b)+c(b′, b″), as required.

When calculating the number of approximate matches (similar characters) and the number of transpositions, we use the strings x and y, and obtain s(x, y)=s(a, b)+s(b″, b′) and r(x, y)=r(a, b)+r(b″, b′).

Protocol 7 implements the chaffing outlined above, by constructing the matrix F (up to the addition of a random binary matrix G generated by Bob) defined in (9), making use of (12).

Two Party Protocol: Permutations

In addition to adding false matches, it will be necessary for Bob to permute the order of the characters in both strings. To see this, suppose, for example, that Alice were to learn that the first character of Alice's string matched some character of Bob's string. Then she would know the identity of one of Bob's characters, although she may not know

---

Protocol 7
Chaffing

Inputs: Alice has the matrix $(M_a M_b^T \wedge R(d)) \oplus B$ and strings a and a′.
Bob has the strings b′ and b″, the matrix B and an $|aa'bb''| \times |bb'|$ binary matrix G.
Outputs: Alice learns $F \oplus G$.

1: Bob sends the matrix $X = G' \oplus G$ to Alice, where $G' = \begin{bmatrix} B \\ H \end{bmatrix}$, and $H = \begin{bmatrix} 0_{|b| \times |b|} & 0 \\ 0 & E(b'', b') \end{bmatrix}$ 2: Alice calculates $F \oplus G = \begin{bmatrix} (M_a M_b^T \wedge R(d)) \oplus B \\ 0_{|aa'bb''| \times |bb'|} \end{bmatrix} \oplus X$

--- the position. In order to prevent this, Bob must permute the characters in Alice's string. Similarly, if Alice could learn that some character in her own string matched the jth character in Bob's string, they could narrow down the possibilities for Bob's jth character to the list of characters which appear in Alice's string. Thus, Bob must ensure that both his string and Alice's string are permuted by some permutation unknown to Alice. In addition, these permutations are necessary to hide which characters are 'fake' characters from a′,a″, b′ or b″, by permuting the rows and columns of the matrix F.

We adopt the convention of describing permutations as either functions, which map the original position of a set element to the final position after permutation, or as matrices, which accomplish the same permutation of elements of a column vector by premultiplying the column vector by the matrix. We will abuse notation to the extent that we will use the same symbol for the function and the matrix. Thus, for example, we could use the symbol P to refer to either the matrix $$P = \begin{bmatrix} 0 & 0 & 1 & 0 & 0 & 0 & 0 \\ 0 & 0 & 0 & 1 & 0 & 0 & 0 \\ 0 & 0 & 0 & 0 & 0 & 0 & 1 \\ 0 & 0 & 0 & 0 & 0 & 1 & 0 \\ 0 & 0 & 0 & 0 & 1 & 0 & 0 \\ 0 & 1 & 0 & 0 & 0 & 0 & 0 \\ 1 & 0 & 0 & 0 & 0 & 0 & 0 \end{bmatrix}$$

or to a function $P:[1, 7] \rightarrow [1, 7]$ such that P(1)=7, P(2)=6, P(3)=1, P(4)=2, etc. Both of these refer to a permutation in which the 1st element of a list is moved to the 7th position, the 2nd element is moved to the 6th position, etc. We specify this explicitly here since it is sometimes easy to confuse this convention with one that specifies the corresponding inverse permutations. There also exists a common convention of arranging a "natural" ordering of elements being permuted on the first row of a matrix, and the new ordering on a second row. Under this convention, our example permutation would be represented by a 2×n matrix of the form $$\begin{bmatrix} 1 & 2 & \ldots & n \\ P^{-1}(1) & P^{-1}(2) & \ldots & P^{-1}(n) \end{bmatrix} = \begin{bmatrix} 1 & 2 & 3 & 4 & 5 & 6 & 7 \\ 3 & 4 & 7 & 6 & 5 & 2 & 1 \end{bmatrix}.$$

In order that these permutations do not lead to a change in the number of transpositions calculated, they are generated randomly, but in such a way that the relative order of identical characters in a string is unchanged. Thus, for example, if Bob's string was 'Johnson', the permutation represented above would not be allowed, since it interchanges the order of the two 'o's in the string. If two characters in Alice's string matched those two 'o's, then we need to match Alice's first 'o' with Bob's first 'o', and Alice's second 'o' with Bob's second 'o'. Otherwise, we would induce a spurious transposition if we matched them in reverse order. Suppose that Alice's string is 'John', Bob's string is 'Johnson', and that, because of the permutation, the 'o' in 'John' is matched with the second 'o' in 'Johnson' instead of the first 'o' in 'Johnson'. Then we would obtain r('Johnson', 'John')=1.5, instead of r('Johnson', 'John')=0 which is correct.

Bob generates a random permutation $P_b:[1,|bb'|] \rightarrow [1,|bb|]$ such that $P_b(i) < P_b(j)$ if $[bb']_i = [bb']_j$ and $i < j$. Bob can permute the columns of F with this permutation without affecting the relative order of any pairs of identical characters in the string bb'. Similarly, Alice will generate a permutation $P_a$ of the rows of F which will not affect the relative order of any pairs of identical characters in aa'.

Alice and Bob could use methods similar to those outlined below to obtain $P_a F P_b^T \oplus H$ and H respectively, and then use these to identify matches between characters in the two strings. However, if one party colluded with Carol, this could divulge information about the other's string. For example, if Alice transmitted a and $P_a$ to Carol, then Carol could determine the identity of any character in b which matched a character in a. Carol would not be able to learn the position of the character in b, since Bob has permuted the columns of F, but she could determine the number of these characters that appear in b.

In order to prevent this, Bob must permute the rows of $P_a F P_b^T$ and Alice permutes the columns. In order that these permutations do not lead to a change in the number of transpositions calculated, they are generated randomly, but in such a way that the relative order of identical characters in a string is unchanged.

In order for Bob to comply with this requirement, when he generates a permutation for the rows of $P_a F P_b^T$ (effectively the characters of the string a'abb"), he must know which characters in aa' are identical. Since the string aa' is now effectively permuted by $P_a$, if Alice gives bob a list which contains a number of sets of identical characters, indicated only by their positions after permutation by $P_a$, then the information which Bob can derive from this is limited to the CGSH of a'a, which is defined below. The procedure for determining Bob's permutation for the rows of $P_a F P_b^T$ is outlined in Protocol 9 below. The same procedure is also repeated in reverse, with a' and b" replaced by a" and b' respectively, so that Alice can also obtain a permutation which will not disturb the relative order of identical characters in a"abb'.

Alice generates a random permutation $P_a:[1,|aa'bb'|] \rightarrow [1, |aa'bb"|]$ such that $P_a(i) < P_a(j)$ if $[aa']_i = [aa']_j$ and $i < j < |aa'|$ and such that $P_a(i) = i$ if $i > |aa'|$. In Protocol 9, for each character x which appears in aa', Alice creates a set $s(x) = \{P_a(i)|[a'a]_i = x\}$. She then sends the set $S = \{s(x) \| |s(x)| > 1\}$ to Bob. Because of the permutation $P_a$, the only information about aa' contained in S is the number of characters in aa' which appear once, twice, three times etc.

For example, in the string s="JOHNSONSN1111222", we have 2 characters {J,H} which appear once, one character {O} which appears twice, 2 characters {N,2} which appear 3 times and one character {1} which appears 4 times. If we define a vector function $\chi(s)$, whose ith component $\chi_i(s)$ denotes the number of characters which appear i times in the string s, then $\chi(\text{"JOHNSONSN1111222"})=(2, 1, 2, 1, 0, 0, \ldots)$. We will refer to $\chi(s)$ as the Character Group Size Histogram (CGSH) of the string s. The CGSH of aa' is exactly the information which Bob learns about aa' from S.

In some cases, knowing the CGSH of a string can narrow the number of possible strings. For example, if we examine a list of common surnames from the U.S. 1990 census, there are some names for which the corresponding CGSH occurs in roughly one out of a million people from which the list is generated. It is thus necessary for Alice to hide this information from Bob. She does this by choosing a' in such a way that the fraction of strings in her database (or some list of interest) with a CGSH smaller (in the sense of element-wise dominance) than $\chi(aa')$ is greater than some threshold. In this way, we guarantee that, even if Bob knew $\chi(aa')$ and the list of possible strings in Alice's database, the smallest group of strings which he could determine (from knowing $\chi(aa')$, since $\chi(a) \leq \chi(aa')$ element-wise) contained a will contain a fraction of the possible strings at least equal to that threshold. For example, if we choose a threshold of 0.5, then knowing $\chi(aa')$, would only narrow down the possibilities for a by one half.

In order to effect the permutations $P_a$ and $P_b$, we must replace the matrix F with $P_a P_b^T$. This can be done using Protocol 8 below. Once Bob has determined Q via Protocol 9, Alice can use protocol 8 to obtain $F' = QP_a F P_b^T$, up to the addition of a random matrix H generated by Bob, according to Protocol 10.

---

Protocol 8 Permutations

---

Inputs: Alice has a sum of two binary matrices $F \oplus G$, and a permutation matrix $P_a$. Bob has the
binary matrix G, a randomly generated binary matrix G", and the permutation matrix $P_b$.
Outputs: Alice learns $P_a F P_b^T \oplus G'$.
1: Alice generates random binary matrices $G_1$ and $G_3$.
Bob generates random binary matrix $G_2$.
2: Bob uses protocol 3 to obtain $Z_1 = P_a (F \oplus G) P_b^T \oplus G_1$
3: Alice uses protocol 3 to obtain $Z_2 = P_a G P_b^T \oplus G_2$.
4: Alice sends $Z_3 = Z_2 \oplus G_1 \oplus G_3 = P_a G P_b^T \oplus G_1 \oplus G_2 \oplus G_3$ to Bob
5: Bob sends $Z_4 = Z_1 \oplus Z_3 \oplus G_2 \oplus G \oplus G' = P_a F P_b^T \oplus G_3 \oplus G'$ to Alice.
6: Alice calculates $Z_4 \oplus G_3 = P_a F P_b^T \oplus G'$

---

Protocol 9 Generation of permutations

---

Inputs: Alice has string aa' and permutation $P_a$. Bob has string $b_0 b"$.
Outputs: Bob generates a permutation $Q : [1, |aa'b_0 b"|] \rightarrow$
  $[1, |aa'b_0 b"|]$ such that $Q(P_a(i)) \leq$
  $Q(P_a(j))$ if $i \leq j$ and $(aa'b_0 b")_i = (aa'b_0 b")_j$.
1: For each character x which appears in aa',
  Alice creates a set $s(x) = \{P_a(i) | [aa']_i = x\}$. Alice
  creates the set $S = \{s(x) \| |s(x)| > 1\}$ and sends S to Bob.
2: For each character x which appears in $b_0 b"$,
  Bob creates a set $t(x) = \{|aa'| + j | [b_0 b"]_j = x\}$.
  Let $T = \{t(x) \| |t(x)| > 1\}$.
3: Bob generates a random permutation
  $Q : [1, |aa'b_0 b"|] \rightarrow [1, |aa'b_0 b"|]$ such that $Q(i) < Q(j)$
  for all pairs i, j such that $i \leq j$ and i, j both appear
  in g for some set g in $S \cup T$. This is
  accomplished by generating a random permutation and
  reordering the elements that appear in
  each set in $S \cup T$.

| Protocol 10 More Permutations |
|---|
| Inputs: Alice has $(P_a FP_b^T) \oplus G'$. Bob has G', random binary matrix H and permutation matrix Q.<br>Outputs: Alice learns $(QP_a FP_b^T) \oplus H$<br>1: Alice generates a random binary matrix $H_a$.<br>2: Alice and Bob use Protocol 3, with roles reversed, so that Bob learns $X = Q (P_a FP_b^T \oplus G') \oplus H_a$.<br>3: Bob sends $Y = X \oplus QG' \oplus H$ to Alice.<br>4: Alice calculates $Y \oplus H_a = (QP_a FP_b^T) \oplus H$ |

Two Party Protocol: Matching Common Characters

The algorithms in the above sections can be combined to obtain Protocol 11, in which Alice and Bob determine matrices $F'_a$ and $F'_b$ respectively such that $F'=F'_a \oplus F'_b = QP_a FP_b^T$, where F is defined as in (9).

Recall that $a_0$ and $b_0$ represent strings, with $|a_0|=|a|$ and $|b_0|=|b|$, composed of characters from two disjoint alphabets, which are also disjoint from the alphabets from which the other strings of interest are generated, so that $a_0$ and $b_0$ have no characters in common and neither have any character in common with a,b,a' or b'. For ease of notation, consider any string x to be a column vector containing the ascii values of the characters in the string as its elements. Also, let x=aa'$b_0$b" and let y=bb', where the concatenation of strings is simply interpreted as concatenation of the corresponding column vectors. Also let $x'=QP_a x$ and $y'=P_b y$. We will also let $|x|$ denote the length, or number of elements of the vector x. This will not lead to confusion as we will not require the notation $|*|$ to denote a norm of any sort.

Alice and Bob now have matrices the exclusive or of which is $F'=QP_a FP_b^T$. This is an $|x'| \times |y'|$ binary matrix such that, $F'_{ij}=1$ only if $x'_i = y'_j$. A character in x' might match more than one character in y', so we must choose which characters in x' to match to which characters in y'. In order to avoid introducing transpositions into the Jaro-Winkler string comparison, we do this as follows.

For each set S of identical characters in x', (for example the set of all e's in 'yvette'), we find the set of matching characters T in y' (for example the set of all e's in "yevett"), and we match the rth character in S to the rth character in T, for r=1, 2, ... min(|S|, |T|). The permutations $P_a$, $P_b$, and Q are chosen to preserve the order of identical characters, so that if we do this (using F'), in spite of the fact that no one knows the original order of the characters in x and y, we will obtain the image under the permutations of the matches we would obtain if we were using E(x, y) instead.

Since the order of identical characters is unchanged in permuting x and y to obtain x' and y', we can execute the assignment of characters by considering each character of x' (row of F') in order and, for each of those characters, assigning the first character in y' (column of F') which matches and has not yet been assigned to some other character in x'. If Alice were to have complete knowledge of F', this process could proceed according to Protocol 15. Alice must not learn F', since that would give her more information than necessary about the strings. However, the same result can be obtained in the case at hand (where Alice and Bob have $F'_a$ and $F'_b$ respectively with $F'F'_a = \oplus F'_b$) via Protocol 16. In Protocol 16, the location of the first matching character is determined via Protocol 12, and the elimination of candidate characters of y' once they have been matched is achieved via Protocol 14. In Protocol 16, Alice and Bob pad their matrices with zeros so that the number of columns is an integer power of two, and manipulate the last column so that a match in the last column indicates no match in the original matrices. The matrix D and the vector d generated in that protocol will be retained for reuse later, in the calculation of the number of approximate matches.

In Protocol 12, we assume that both participants have a generator G of order r for an additive group in which division by a group element (i.e. additive analog of discrete logarithm for a multiplicative group) is infeasible and a function M(*) which maps binary vectors to an element of the group in such a way that collisions are extremely rare. They also both have a function H(*), which maps group elements to integers and a hash function h(*) defined on integers whose inverse is infeasible to apply. Alice and Bob have integer private keys $k_a$, $k_b < r$ and all three participants know the public keys $K_a = k_a G$ and $K_b = k_b G$. The participants also share knowledge of a sequence of group elements, $C^0, C^1, \ldots, C^n$ of some sufficient length n. We will say, for brevity that the participants all have the "'protocol kit'" (G, H, h, k, K, C), where k and K represent the sets of private and public keys respectively, and where C represents the sequence of group elements.

Two Party Protocol: Determining the Number of Transpositions

In the previous section, we have obtained the vectors, X' and Y', which specify (respectively) which of the characters in x' and y' have common characters in the other string. Let X

| Protocol 11 Permuted Match Matrix |
|---|
| Inputs: Alice has strings a and a'. Bob has strings b,b' and b". Alice has permutation $P_a$ of length $|aa'bb"|$. Bob has permutations $P_b$ of length $|bb'|$. Both Alice and Bob know $|aa'|$, $|bb'|$ and $|bb"|$.<br>Outputs: Alice and Bob determine matrices $F_a'$ and $F_b'$ respectively such that $F' = F_a' \oplus F_b' = QP_a FP_b^T$, where F is defined as in (9).<br>1: Alice generates $M_a$ and Bob generates $M_b$ according to (10) and (11) respectively.<br>2: Bob generates permutation Q according to Protocol 9.<br>3: Bob generate $|aa'| \times |bb'|$ random binary matrix B'. Alice and Bob execute Protocol 3 so that Alice learns $M_a M_b^T \oplus B^1$.<br>4: Bob generates a $|aa'| \times |bb'|$ random binary matrix B. Alice and Bob execute Protocol 6 so that Alice learns $(M_a M_b \wedge R(d)) \oplus B$ where $d = \frac{1}{2} \max\{|a|, |b|\} - 1$.<br>5: Bob generates an $|aa'bb"| \times |bb'|$ random binary matrix G. Alice and Bob execute Protocol 7 so that Alice learns $F \oplus G$, where F is as defined in (9)<br>6: Bob generates an $|aa'bb"| \times |bb'|$ random binary matrix G'. Alice and Bob execute Protocol 8 so that Alice learns $P_a FP_b^T \oplus G'$.<br>7: Bob generates an $|aa'bb"| \times |bb'|$ random binary matrix H. Alice and Bob execute protocol 10, so that so that Alice learns $QP_a FP_b^T \oplus H$.<br>8: Alice sets $F_a' = QP_a FP_b^T \oplus H$ and Bob sets $F_b' = H$ | and Y denote those vectors corresponding to x and y respectively, so that $X=P_a^T Q^T X'$ and $Y=P_b^T Y'$. We will say that a character in x (or y) is 'matched' if $X_i=1$ (or $Y_i=1$). The number of matched characters in x which appear at or before the ith character of x is given by the ith component of $p=LX$, where L is a binary matrix of the appropriate size, with $L_{ij}=1$ if f $i \geq j$. Similarly, the number of matched characters in y which appear at or before the jth character of y is given by the jth component of $q=LY$.

According to the prescription in [14], we count one half of a transposition for each pair (i, j) such that $X_i=Y_j=1$, $p_i=q_j$ and $x_i \neq y_j$. The last condition is equivalent to $F_{ij}=0$.

If we now define $p'=QP_a LX=QP_a LP_a^T Q^T X'$, and $q'=P_b LY=P_b LP_b^T Y'$, then the three conditions above are equivalent to $X'_i=Y'_j=1$, $p'_i=q'_j$ and $x'_i \neq y'_j$. To see this, note that, if $X'_i=1$, then $p'_i$, by the construction of p', represents the ordinal number of the ith character of x' in the list of common characters ($X'_i=1$), ordered according to their original order in $x=aa'b_0 b''$. A similar interpretation holds for $q'_j$ when $Y'_j=1$. Since there are the same number of common characters in both strings (by definition), for each value of i such that $X'_i=1$, we will find exactly one value of j such that $Y'_j=1$ and $p'_i=q'_j$. Also note that the condition $x'_i \neq y'_j$ is equivalent to the condition $F'_{ij}=0$ where $F'=QP_a FP_b^T$.

---

Protocol 12 Finding the first match - Part One

---

Inputs: Alice and Bob have binary vectors x and y respectively of length $2^n$. Alice and Bob have a protocol kit (G, H, h, k, K, C).

Outputs: Alice determines $k = \min\{m \in [1, 2^n] | x_m \neq y_m\}$. Bob obtains an integer vector of length $2^n$, denoted by E, and Alice obtains an integers e, such that the kth element ($E_k$) of E is equal to e, and such that Alice has no information about any other elements of E.

1: Alice sets $k = 1$
2: for all $j \in [1, n]$ do
3:  Alice sets $k \leftarrow 2k - 1$.
4:  Alice and Bob divide each of x and p respectively into two binary vectors of length $2^{n-j}$, according to $x = (x_0, x_1)$ and $y = (y_0, y_1)$.
5:  Alice generates a random integer $x < r$ and sends $X = M(x_0) - xG$ to Bob.
6:  Bob calculates $Y = H(k_b[M(y_0) - X_1])$ and sends $Z = h(Y)$ to Alice.
7:  Alice determines that $x_0 = y_0$ if and only if $Z = h(H(xK_b))$.
8:  Alice generates random integers c, $c_j < r$.
9:  if $x_0 = y_0$ then
10:    Alice sets $k = k + 1$
11:    Alice sends $C_j = C^1 - c_j G$ to Bob.
12:  else
13:    Alice sends $C_j = C^0 - c_j G$ to Bob.
14:  end if
15:  Continued in Part Two

---

Protocol 13 Finding the first match - Part Two

---

16:  Bob generates a random integer $b < r$ and calculates
     $E_{j0} = H(k_b(C^0 - C_j))$
     and $E_{j1} = H(k_b(C^1 - C_j)) \oplus Y$.
     Bob then sends $E_{j0}' = E_{j0} \oplus y_0 \oplus b$ and
     $E_{j1}' = E_{j1} \oplus y_1 \oplus b$ to Alice.
17:  if $x_0 = y_0$ then
18:    Alice sends $E = E_{j1}' \oplus H(c_j K_b) \oplus H(xK_b) \oplus c$ to Bob and sets sets $x \leftarrow x_1 \oplus c$.
19:  else
20:    Alice sends $E = E_{j0}' \oplus H(c_j K_b) \oplus c$ to Bob and sets sets $x \leftarrow x_0 \oplus c$.
21:  end if
22:  Bob sets $y \leftarrow E \oplus b$.
23: end for
24: Bob sets $E_m = \oplus_{j-1}^n [m]_j E_{j0} + (1 - [m]_j) E_{j1}$ for $m \in [1, 2^n]$, where $[m]_j$ denotes the jth most significant bit of a binary representation of the integer m.
25: Alice sets $e = \oplus_{j-1}^n H(c_j K_b)$.

---

Protocol 14 Zero Column

---

Inputs: Alice and Bob have $m \times 2^n$ binary matrices $F_a$ and $F_b$ respectively. Carol has an integer $j \in [1, 2^n]$ and an integers e. Bob has an integer vector E of length $2^n$, such that $E_j = e$.

Outputs: Alice and Bob determine binary matrices $G_a$ and $G_b$ respectively such that the ith row and jth column of $G = G_a \oplus G_b$ is zero if $j < 2^n$, and such that all other columns of G are equal to the corresponding columns of $F = F_a \oplus F_b$.

1: Alice and Bob generate random binary matrices A and B respectively.
2: For each $k \in [1, 2^{n-1}]$, Bob constructs $F_b^k$ from $F_b$ as the elementwise exclusive or of B with the kth element $E_k$ of E and with the matrix obtained from $F_b$ by replacing its ith row and kth column with zeros. Bob also sets $F_b^{2n} = F_b \oplus E_2^n$. and sends $F_b^k$ to Alice for each $k \in [1, 2^n]$.

-continued

Protocol 14 Zero Column

3: Alice sends $X = F_a{}^j \oplus d \oplus A$ to Bob.
4: Alice and Bob set $G_a = F_b{}^j \oplus A$ and $G_b = X \oplus B$ respectively.

---

Protocol 15 Matching Common Characters

Inputs: Alice has $|x| \times |y|$ binary matrix F.
Outputs: Alice generates $|x| \times 1$ and $|y| \times 1$ binary matrices X and Y.
1: Alice sets $X = 0_{|x| \times 1}$, and $Y = 0_{|y| \times 1}$
2: for all $i \in [1, |x|]$ do
3:     candidates $\leftarrow \{j \in [1, |y|] \mid F_{ij} = 1 \text{ and } Y_j = 0\}$
4:     if candidates $\neq \phi$ then
5:        $X_i \leftarrow 1$
6:        $Y_{min(candidates)} \leftarrow 1$
7:     end if
8: end for

---

Protocol 16 Matching Common Characters

Inputs: Alice has $|x'| \times |y'|$ binary matrix $F_a'$ and Bob has $|x'| \times |y'|$ binary matrix $F_b'$.
Outputs: Alice learns the binary vectors X' and Y' that would result from implementing Protocol 15 with input $F_a' \oplus F_b'$. Bob obtain $|x'| \times 2^n$ integer matrix E, where n is the smallest integer such that $2^n > |y'|$ and Bob obtains integer vector e of length $|x'|$ such that $E_{ij} = e_i$ if and only if the the ith character in x' is assigned to the jth character in y' or $j = 2^n$ and no character in y' is assigned to the ith character of x'.
1: Alice sets $X' = 0_{|x'| \times 1}, Y' = 0_{|y'| \times 1}$ and $F_1 = F_a'$. Bob sets $F_2 = F_b'$.
2: Alice and Bob pad $F_1$ and $F_2$, respectively, on the right with columns of zeros until the number of columns is equal to a power of 2. Bob then replaces the last column of the new $F_b'$ with a column of all ones.
3: Let $2^n$ be the number fo columns in $F_1$ and $F_2$.
4: for all $i \in [1, |x'|]$ do
5:     Alice obtains $j = \min\{k \in [1, 2^n] \mid [F_1]_{ik} \neq [F_2]_{ik}\}$ and e and Bob obtains integer vector E via Protocol 12.
6:     if $j < 2^n$ then
7:        Alice sets $X_i' = 1$ and $Y_j' = 1$.
8:     end if
9:     Alice and Bob implement Protocol 14 (with $F_a = F_1$ and $F_b = F_2$) to obtain $G_1$ and $G_2$.
10:    Alice and Bob set $F_1 \leftarrow G_1$ and $F_2 \leftarrow G_2$ respectively.
11:    Alice and Bob set the ith row of and E to the matrix E obtained from Protocol 12. Alice sets the ith elemsents of the vector e to the integer (also denoted by e in Protocol 12) obtained from Protocol 12.
12: end for

---

Alice can check these conditions without learning X or Y. This is important, since, for example, if Alice were to learn X, she could obtain a list of characters which appear in y.

Protocol 20 below outlines a method by which Alice can obtain a matrix $\mu'$ such that $\mu'_{ij} = 1$ iff $X'_i = Y'_j = 1$ and $p'_i = q'_j$. This will require Protocol 17, a slight generalization of Protocol 3, which instead of obtaining the sum (modulo 2) of a random binary vector and a row-permuted version of a binary matrix, we obtain the sum of a general random vector and a row-permuted matrix. This is a generalization of Protocol 3 in that, if the matrices are all binary, the multiplication and addition operators in Protocol 17 could be taken to represent conjuction and exclusive or, respectively. We will also need Protocols 18 and 19 as intermediate steps.

The number of transpositions is given by $$t = \frac{1}{2} e_a^T (F^t \wedge \mu') e_b$$

where $e_a$ and $e_b$ are column vectors of ones of lengths $|x|$ and $|y|$ respectively. Note that this result is not as obvious as it seems. If the component of $\mu'$ in the ith row and jth column is non-zero, then we need to add one half to the number of transpositions for that element if the ith character of x' is the same as the jth character of y'. By the construction of F and F', this is equivalent to $F'_{ij} = 1$ if these characters come from one of the chaffing strings a',b' or b'', since there is no range matrix involved in that case. However, for the block of F which corresponds to the original strings a and b, the condition $F_{ij} = 1$ means not only that the ith character of a matches the jth character of b, but also that $|i-j| \leq d(a, b)$. Luckily, however, it turns out that if the position of those two characters within the list of assigned characters in a and b is the same, then we must also have $|i-j| \leq d(a, b)$.

This can be proved by induction as follows. Suppose that the first assigned characters in a and b are out of range (i.e they are in positions i and j for which $|i-j| > d(a, b)$) and assume without loss of generality that the character from a occurs earlier than the character from b. Then all of the characters in b are out of range of that character from a and we have a contradiction. Assume now that the first k-1 pairs of assigned characters (one from each of a and b) are within range of each other and that the kth pair is out of range. Assume, without loss of generality, that the kth assigned character of a occurs earlier than the kth assigned character of b. Then the first k assigned characters of a must all be assigned to one of the first k-1 assigned characters in b (since they are all out of range of the kth and later assigned characters from b), but this clearly leads to a contradiction, since the assignment of characters is one to one.

---
Protocol 17 Choice of Rows
---
Inputs: Alice has an m × n binary matrix A such that Ae ≦ e, where e is a column vector of 1s.
　　Bob has an n × l matrix B and a randomly generated m × l matrix C.
Outputs: Alice learns AB + C
　1: For each i = 1, 2, ..., m, Bob calculates the matrix $B^{(i)} = B + eC_i$ and the row vector
　　$b^{(i)} = C_i$, where $C_i$ denotes the ith row of C.
　2: Since Ae ≦ e, for each i ∈ [1, m], either $[Ae]_i = 0$ or $[Ae]_i = 1$ and there is exactly one
　　integer $k_i \in [1, n]$ such that $A_{ik_i} = 1$ and $A_{ij} = 0$ for all $j \ne k_i$. For each i = 1, 2, ..., m,
　　Alice uses 1 out of n + 1 oblivious transfer to obtain $b^i$ (if $[Ae]_i = 0$), or the $k_i$th row of $B^{(i)}$
　　(if $[Ae]_i = 1$), and sets the ith row of her result to this value.
---

Two Party Protocol: Approximate Matches

The version of the Jaro-Winkler string comparator used in the U.S. census includes a modification which accounts for characters which are approxi—

---
Protocol 18 Transpositions: Intermediate Step 1
---
Inputs: Alice has vector X', permutation matrix $P_a$ and vector a.
　　Bob has permutation matrix Q
　　　and integer l. Both have matrix L and integer l.
Outputs: Bob obtains $QP_a LP_a^T Q^T X' + l(e - X') + a$ (where e is a vector of ones).
　1: Bob generates random vectors $b_1$ and $b_2$,
　　and Alice generates random vector c.
　2: Bob obtains $y_1 = Q^T X' + c$ from
　　Alice via Protocol 17.
　3: Alice obtains $y_2 = P_a^T y_1 + b_1$ and $y_3 = P_a(L - lI)b_1 +$
　　$b_2$ from Bob via Protocol 17 and
　　calculates $y_4 = P_a(L - lI)(y_2 - P_a^T c) - y_3 =$
　　$P_a(L - lI)P_a^T Q^T X - b_2$.
　4: Bob obtains $y_5 = Qy_4 + a$ from Alice via
　　Protocol 17 and calculates $y_5 + Qb_2 + le =$
　　$QP_a(L - lI)P_a^T Q^T X' + le + a = QP_a LP_a^T Q^T X' + l(e - X') + a$.
---

---
Protocol 19 Transpositions: Intermediate Step 2
---
Inputs: Alice has vector Y'. Bob has permutation matrix $P_b$ and vector b.
Both have matrix L.
Outputs: Alice obtains $P_b LP_b^T Y' + b$.
　1: Alice generates random vectors $a_1$ and $a_2$.
　2: Bob obtains $y_1 = P_b^T Y' + a_1$ and $y_2 = P_b La_1 - a_2$ from
　　Alice via Protocol 17.
　3: Bob sends $y_3 = P_b Ly_1 - y_2 + b = P_b LP_B^T Y' + a_2 + b$ to Alice.
　4: Alice calculates $y_3 - a_2 = P_b LP_B^T Y' + b$
---

---
Protocol 20 Transpositions
---
Inputs: Alice has vectors X' and Y', permutation matrix $P_a$ and binary
　　matrix $F_a'$. Bob has permutation matrices $P_b$ and Q and binary
　　matrix $F_b'$. Both have matrix L.
Outputs: Alice obtains the matrix $K = F' \wedge \mu'$ where $F' = F_a' \oplus F_b'$
　　and where μ' is a binary
　　matrix with $\mu_{ij}' = 1$ iff $X_i' = Y_j' = 1$ and
　　$p_i' = q_j'$ where $p' = QP_a LP_a^T QTX$, and $q' = P_b LP_b^T Y'$.
　1: Assume X' and Y' are $l_a \times 1$ and $l_b \times 1$ vectors respectively and
　　let $l' = \max\{l_a, l_b\}$. Alice
　　generates an $l_a \times 1$ random vector a and an $l_a \times l_b$ random
　　matrix A. Bob generates an $l_b \times 1$
　　random vector b and an $l_a \times l_b$ random matrix B.
　2: Bob obtains $y_a = p' + (l + 1)(e - X') + a$ via protocol 18
　　with l = l' + 1.
　3: Alice obtains $q' + b = P_b LP_b^T Y' + b$ via
　　protocol 19 and sets $y_b = q' + b + 2(l' + 1)(e - Y')$.
---

---
Protocol 20 Transpositions
---
　4: Alice sends $Y_b = (y_b + a)e^T + 3(l' + 1)\overline{F_a}' + A$ to Bob, where $\overline{X}$
　　represents the element-wise complement of any binary matrix X.
　5: Bob sends $Y_a = (y_a + b)e^T + 3(l' + 1)F_b'$ and
　　the element-wise hashing $H_1 = \text{hash}(Y_b + B)$ to Alice.
　6: Alice calculates the matrix K such that $K_{ij} = 1$ if and only
　　if $[H_1]_{ij} = \text{hash}([Y_a + A]_{ij})$.
--- mate matches, in the sense that they are often mistyped for one another or erroneously substituted for one another in optical character recognition. We will denote this relation between characters by the symbol '≈'. For any two strings x and y, we define the approximate match matrix A(x, y) such that $$A(x, y)_{ij} = \begin{cases} 1 & \text{if } x_i \approx y_j \\ 0 & \text{otherwise} \end{cases}$$

For any string x, constructed from the alphabet α, we define the |x|×|α| matrix N(x) such that $$N(x)_{ij} = \begin{cases} 1 & \text{if } x_i \approx \alpha_j \\ 0 & \text{otherwise} \end{cases}$$

We also define, analogous to $M_a$ and $M_b$, the |aa'|×|α| matrix $N_a$ and the |bb'|×|α| matrix $N_b$ such that $$[N_a]_{ij} = \begin{cases} 1 & \text{if } i \le |a| \text{ and } a_i \approx \alpha_j \\ 0 & \text{otherwise} \end{cases}$$

$$[N_b]_{ij} = \begin{cases} 1 & \text{if } i \le |b| \text{ and } b_i \approx \alpha_j \\ 0 & \text{otherwise} \end{cases}$$

In order to calculate the number of approximate matches, Alice uses protocol 3 to obtain (up to the addition modulo two of a random binary matrix) $M_a N_b^T$, which has A(a, b) in its upper left hand corner.

If there were no approximate matches for fake characters (i.e. those in b" or b'), it would be obvious that any character involved in an approximate match must be real (i.e. from a or b). It is thus necessary to create false approximate matches as well. We do this in a manner analogous to that used in Section, where $M_a M_b^T \wedge R(d)$, and E(b|, b') in Protocol 7 are replaced by $M_a N_b^T$, and A(b", b') respectively. This gives rise to a situation in which Bob has some random |aa'bb"|×|bb'| binary matrix $H_b$ and Alice has a matrix $H_a$ such that $$H = H_a \oplus H_b = \begin{bmatrix} A(a,b) & 0 \\ 0 & 0 \\ 0_{|b|\times|b|} & 0 \\ 0 & A(b'',b') \end{bmatrix}$$

Protocols 8 and 10 are then used so that Alice and Bob learn $H'_a$ and $H'_b$ such that $H' = H'_a \oplus H'_b = QP_a HP_b^T$. We then use Protocol 21 to eliminate the rows and columns of G' corresponding to characters which are already assigned and then apply Protocol 22 to find the approximate matches.

Two Party Protocol: Leading Character Matches

The second modification to the Jaro-Winkler string comparator requires the calculation of the number of successive characters i(a, b) in the two strings a and b being compared. This poses some difficulty in the blind comparison case, since, for example, if Alice knew that the first two or three characters of her string a matched the first two or three in Bob's string b, that would give Alice significant information about Bob's string. It is thus necessary that neither of the participants learn i(a, b). Instead, Bob generates a random permutation $v=(v_0, v_1, \ldots, v_4)$ of the integers in [0, 4], and Alice learns only $v_{i(a,b)}$. In the final calculation (Protocol 25, Bob generates all possible values of the string comparator, and arranges

---

Protocol 21 Zero Column

---

Inputs: Alice has an $|x'| \times |y'|$ binary matrix $G_a'$, an integer vector J of length $|x'|$ and an integer vector e of length $2^n$, where n is the smallest integer such that $2^n > |y'|$. Bob has an $|x'| \times |y'|$ binary matrix $G_b'$ and an $|x'| \times 2^n$ integer matrix E, such that $E_{i,J_i} = e_i$ for each $i \in [1, |x'|]$.

Outputs: Alice and Bob determine binary matrices $H_a$ and $H_b$ respectively such that, for $i \in [1, |x'|]$, the ith row and $J_i$th column of $H = H_a \oplus H_b$ are both zero if $J_i < 2^n$, and are the same as the corresponding row and column of $G' = G_a' \oplus G_b'$ if $J_i = 2^n$.

1: Alice and Bob set $H_a = G_a'$ and $H_b = G_b'$ respectively.
2: for all $i \in [1, |x'|]$ do
3:    Alice and Bob generate random binary matrices A and B respectively.
4:    For each $k \in [1, 2^{n-1}]$, Bob constructs $H_b^k$ from $H_b$ as the elementwise exclusive or of B with $E_{ik}$ and with the matrix obtained from $H_b$ by replacing its ith row and kth column with zeros. Bob also sets $H_b^{2^n} = H_b \oplus E_{i,2^n}$ and sends $H_b^k$ to Alice for each $k \in [1, 2^n]$.
5:    Alice sends $Y = H_b^{J_i} \oplus e_i \oplus A$ to Bob.
6:    Alice sets $H_a \leftarrow H_a \oplus A$ and Bob sets $H_b \leftarrow Y \oplus B$ respectively.
7: end for

---

Protocol 22 Matching Common Characters

---

Inputs: Alice has $|x'| \times |y'|$ binary matrix $H_a$ and Bob has $|x'| \times |y'|$ binary matrix $H_b$.

Outputs: Alice learns the binary vectors X' and Y' that would result from implementing Protocol 15 with input $H_a \oplus H_b$.

1: Carol sets $X' = 0_{|x'|\times 1}$ and $Y' = 0_{|y'|\times 1}$. Alice sets $G_1 = H_a$. Bob sets $G_2 = H_b$.
2: Alice and Bob pad $H_1$ and $H_2$, respectively, on the right with columns of zeros until the number of columns is equal to a power of 2. Bob then replaces the last column of the new $H_2$ with a column of all ones.
3: Let $2^n$ be the number of columns in $H_1$ and $H_2$.
4: for all $i \in [1, |x'|]$ do
5:    Alice determines via Protocol 12 $j = \min\{k \in [1, 2^n] | [H_1]_{ik} \neq [H_2]_{ik}\}$. Via Protocol 12, Bob also obtain vector E and Alice obtains integer e such that $E_j = e$.
6:    if $j < 2^n$ then
7:      Alice sets $X_i' = 1$ and $Y_j' = 1$.
8:    end if
9:    Alice and Bob implement Protocol 14 (using E and e and with $F_a$ set to $H_1$ and $F_b$ set to $H_2$) to obtain $G_a$ and $G_b$.
10:   Alice and Bob set $H_1 \leftarrow G_a$ and $H_2 \leftarrow G_b$ respectively.
11: end for

--- them in such a way that Alice requires knowledge of $v_{i(a,b)}$ and no knowledge of i(a, b) in order to ensure that the correct value of the string comparator is chosen in the final calculation outlined in the following section.

Protocol 23 outlines the method by which Alice can learn $v_{i(a,b)}$. It is also necessary to run this protocol with the roles of Alice and Bob reversed, so that Alice generates a random permutation $u=(u_0, v_1, \ldots, u_4)$ of the integers in [0, 4], and Bob learns $u_{i(a,b)}$.

---
Protocol 23 Leading Caracter Matches - Part One
---

Inputs: Alice and Bob have strings a and b. Bob has vector $v = (v_0, v_2, \ldots, v_4)$ consisting of
    some permutation of the numbers in $[0, 4]$. Both have knowledge of an additive cyclic group
    of order r with generator G.

Outputs: Alice learns $v_i$, where $i \in [0, 4]$ is the number of leading characters in a which match
    the corresponding leading characters in b, (i.e. $i = \max_{j \in [0,4]} \{j | a_k = b_k \forall k \leq j\}$).

1: For each $i \in [0, 4]$, Alice generates random integer $z_i$ and sends $X_i = z_i G$ to Bob
2: Bob generates random integer $y_1$, and for each $i \in [0, 4]$ he generates a random integer $T_i^1$. Let
   $\alpha$ be the the alphabet for a and b. For each $j \in [1, |\alpha|]$, Bob creates a $4 \times 2$ matrix $T^{(j)}$, such
   that, for $i \in [0, 3]$, $T_{i,*}^{(j)} = [r_i^1 G, y_1 r_i^1 X_{v_i+1}]$ if $j = b_1$ and $T_{i,*}^{(j)} = [r_i^1 G, y_1 r_i^1 X_{v_0}]$ otherwise,
   where we use the notation $B_{i,*}$ to denote the ith row of B.
3: Alice uses oblivious transfer to obtain $T^{(a1)}$, and sets $T = T^{(a1)}$.
4: Alice generates random integer $x_1$ and random integers $r_i^2$ for $i \in [0, 2]$ and, for each $j \in [1, |\alpha|]$, she constructs a $3 \times 2$ matrix $T^{(j)}$ such that, for $i \in [0, 2]$, $T_{i,*}^{(j)} = [x_1 r_i^2 T_{i+1,0}, r_i^2 T_{i+1,1}]$
   if $j = a_2$ and $T_{i,*}^{(j)} = [x_1 r_i^2 T_{0,0}, r_i^2 T_{0,1}]$ otherwise.
5: Bob uses oblivious transfer to obtain $T^{(b2)}$ and sets $T = T^{(b2)}$.
6: Bob generates a random integer $y_2$ and random integers $r_i^3$ for $i \in [0, 1]$ and for each $j \in [1, |\alpha|]$
   constructs a $2 \times 2$ matrix $T^{(j)}$ such that, for $i \in [0, 1]$, $T_{i,*}^{(j)} = [r_i^3 T_{i+1,0}, y_2 r_i^3 T_{i+1,1}]$ if $j = b_3$
   and $T_{i,*}^{(j)} = [r_i^3 T_{0,0}, y_2 r_i^3 T_{0,1}]$ otherwise.
7: Alice uses oblivious transfer to obtain $T^{(a3)}$ and sets $T = T^{(a3)}$.
8: Alice generates random integers $x_2$ and $r^4$ and, for each $j \in [1, |\alpha|]$ constructs a $1 \times 2$ matrix
   $T^{(j)}$ such that $T_{i,*}^{(j)} = [x_2 r^4 T_{i+1,0}, r^4 T_{i+1,1}]$ if $j = b_3$ and $T_{i,*}^{(j)} = [x_2 r^4 T_{0,0}, r^4 T_{0,1}]$ otherwise.
9: Continued in Part Two below ---
Protocol 24
Leading Caracter Matches - Part Two
---

10: Bob uses oblivious transfer to obtain $T^{(b4)}$ and sets $T = [T_0, T_1] = T^{(b4)}$.

11: Bob sends the second component $T_1$ of T to Alice and retains the first component $T_0$.

12: Alice constructs a vector $u = (u_0, u_1, \ldots, u_4)$ consisting of a permutation of the numbers in $[0, 4]$, and for each $j \in [0, 4]$, she sends $T^{(j)} = \frac{x_1 x_2}{z_{u_j}} T_1$ to Bob.

13: Bob finds $j \in [0, 4]$ such that $T^{(j)} = y_1 y_2 T_0$ and sends j to Alice.

14: Alice determines that $v_i = u_j$.

Two Party Protocol: Final Calculation

Protocol 25 can be used to obtain the value of the Jaro-Winkler string comparison by defining the function $f_b$ appropriately. This function is designed in such a way as to limit the number of bits of precision with which Alice can learn the value of the Jaro-Winkler string comparator. This is because, if Alice could evaluate the function with unlimited precision, then she might be able to identify, for example, not only $f_b(\alpha+\beta \bmod L)$ but also $\alpha+\beta \bmod L$ as well, since there may be only one, or a few possibilities for $(x_1, \ldots, x_6)$ for which $f_b(x_1, \ldots, x_6)$ takes on a particular value. Limiting the precision of $f_b$ increases the number of possibilities significantly, so that it is less likely that Alice could learn something other than the value of the string comparator. The function $f_b$ is based on the function $\Phi_3$ defined in Section above, for the Jaro-Winkler string comparator. We define the function f according to $$f(x_1, \ldots, x_6) = \begin{cases} \Phi_2 + (1 - \Phi_2) \frac{x_1 - x_4 - 1}{x_5 + x_6 - 2x_4 + 2} & \text{if condition } (x_1, x_2, x_3, x_4, x_5, x_6) \\ \Phi_2(x_1, \ldots, x_6) & \text{otherwise} \end{cases} \quad (14)$$

where
$$\text{condition } (x_1, x_2, x_3, x_5, x_6) = (\Phi_1(x_1, x_2, x_3, x_5, x_6) > .7) \wedge (x_1 > x_4 + 1) \wedge (4 < \min(x_5, x_6) < 2x_1 - i)$$

$$\Phi_2(x_1, \ldots, x_6) = \begin{cases} \Phi_1(x_1, x_2, x_3, x_5, x_6) & \text{if } \Phi_1(x_1, x_2, x_3, x_5, x_6) \leq 0.7 \\ \Phi_1(x_1, x_2, x_3, x_5, x_6) + \\ .1 x_4(1 - \Phi_1(x_1, x_2, x_3, x_5, x_6)) & \text{otherwise} \end{cases}$$

$$\Phi_1(x_1, x_2, x_3, x_5, x_6) = \Phi(x_1, x_3, x_5, x_6) + .3 x_2 \left( \frac{W_1}{x_5} + \frac{W_2}{x_6} \right)$$

and $$\Phi(x_1, x_3, x_5, x_6) = x_1 \left( \frac{W_1}{x_5} + \frac{W_2}{x_6} \right) + W_t \left( 1 - \frac{x_3}{x_1} \right). \quad (15)$$

Here we have identified $x_1, x_2, x_3, x_4, x_5$ and $x_6$ with c(a, b), s(a, b), r(a, b), i(a, b), |a| and |b| respectively, which appear in (1)-(5). Let L be an upper bound on $|aa'|$ and $|bb'|$. We apply Protocol 25 with $$f_b(x_1, x_2, x_3, x_4, x_5) = f(x_1, x_2, x_3, [v^{-1}]_{x_4}, x_5, |b|)$$

$$\alpha = (E(x,y), A(x,y), r(x,y), [v^-]_{x_4}, m, 0)$$

$$\beta_b = (-E(b', |b|), -A(b', |b|), -r(b', |b|), 0, 0, |b|) \bmod L$$

where $v^{-1}$ represent the inverse permutations of v from Section.

Detailed Description of Three Party Jaro-Winkler Protocol

In this section, we provide a detailed description of the three party protocol which calculates the Jaro-Winkler string comparator in the case where the participants are assumed to be semi-honest. Some of this material will be identical to that for the two party protocol described above, but we have split the detailed description between the two cases, in the interest of clarity.

Three Party Protocol: Determining Common Characters (Exact Matches)

Suppose that Alice has string a and Bob has string b. In order to evaluate the Jaro-Winkler string comparator on this pair of strings, the first step requires determination of the number of characters in common in a and b.

she could learn that $b_j = b_k$. In order to hide this information, Alice permutes the characters a and Bob permutes the characters in b. This way, Carol may learn of a number of identical characters in one of the strings, but she cannot learn the positions of these characters.

---

Protocol 25 Function Evaluation

Inputs: Alice, and Bob have integer vectors α, and β respectively, both of length l with α, β, ∈ [0, L] for some integer L. Both have a function $f_b : D \to \{0, 1\}^d$ for some integer d with domain $D \subseteq [0, L]^l$ such that α ∈ D and (α + β) mod L ∈ D. Both have a generator G of an additive group X of order r, for which division by a group element (i.e. additive analog of discrete logarithm) is difficult to compute, and both have L + 1 elements $C_0, C_1, ..., C_L$ of the group. Both also have a function $g : X \to \{0, 1\}^{d+d'}$ defined on the elements of the group, for some integer d'.

Outputs: Alice learns $f_b(\alpha + \beta \mod L)$.

1: For each i ∈ [1, l], Alice generates a random integer $x_i \in [0, r-1]$ and sends $X_i = C_{\alpha_i} - x_i G$ to Bob.
2: Bob generates a random integer y ∈ [0, r − 1] and sends Y = yG to Alice.
3: For each i, j ∈ [1, l], Bob calculates $B_{ij} = y(C_j - X_i)$. For each e ∈ D, he sets h(e) = $f_b(e + \beta \mod L) \oplus \oplus_{i=1}^{l} g(B_{i,e_i})$ if e − β mod L ∈ D and h(e) = $\oplus_{i=1}^{l} g(B_{i,e_i})$ otherwise.
4: For each e ∈ D, Bob sends h(e) to Alice.
5: Alice calculates $f_b(\alpha + \beta \mod L) = h(\alpha) \oplus \oplus_{i=1}^{l} x_i Y$

---

For any two strings x and y we define the |x|×|y| exact match matrix E(x, y) such that $$E(x, y)_{ij} = \begin{cases} 1 & \text{if } x_i = y_j \\ 0 & \text{otherwise} \end{cases} \quad (16)$$

Also for any three positive integers m, n and r, we define the m×n range matrix R(m, n, r) such that $$R(m, n, r)_{ij} = \begin{cases} 1 & \text{if } |i - j| \leq r \\ 0 & \text{otherwise} \end{cases} \quad (17)$$

R(m, n, r) has a diagonal band of maximum width 2r+1. We can determine which characters the string a has in common with what characters in b if we can obtain the matrix E(a,b) ∧ R(|a|,|b|,d(|a|,|b|))

where ∧ represents elementwise conjunction and $$d(x, y) = \frac{1}{2} \max\{|x|, |y|\} - 1.$$

We do not, however, want Alice or Bob to reveal |a| or |b| to the other, since that would, in some cases, provide information about the strings. For example, if the strings represent surnames, and one of the strings is very short or very long, say 13 characters or more, then knowing the length of the string would allow one to compile a short list of possible surnames which very likely contains the name. In order to hide the length of strings a and b, we will need to pad them in some way.

To address this, we simply pad a and b on the right with $a_{pad}$ and $b_{pad}$ respectively, where $a_{pad}$ and $b_{pad}$ are chosen from alphabets which have no characters in common with each other or with the alphabet α, from which a and b are drawn.

Three Party Protocol: Chaffing

In the blind Jaro-Winkler algorithm, we need to determine the matrix E(a, b) ∧ R(|a|, |b|, d). However, having a matrix of this form can reveal much about the two strings to the participants. For example, if Carol learned that $b_j = a_i$ and $b_k = a_i$, then Even with this, however, if someone had access to E(a, b) ∧ R(|a|, |b|, d(|a|, |b|)), they could learn, in the worst case, the number of characters which appear in a once, twice, three times, etc. This is because if we know that a group of Alice's characters all match the same character from Bob's string, then those characters of Alice's must all be identical. If each character in one string were identical to some character in the other string, and no pairs of characters are out of range (i.e. E(a, b) ∧ R(|a|, |b|, d, 0) = E(a, b)), then we could deduce the number of characters that appear once, twice, three times etc. If not all characters are matched, or if some pairs are out of range, then we could still gain partial information of this form.

For example, in the string s="JOHNSONSN1111222", we have 2 characters {J,H} which appear once, one character {O} which appears twice, 2 characters {N,2} which appear 3 times and one character {1} which appears 4 times. If we define a vector function χ(s), whose ith component $\chi_i(s)$ denotes the number of characters which appear i times in the string s, then χ("JOHNSONSN1111222")=(2, 1, 2, 1).

In some cases, knowing the CGSH of a string can narrow the number of possible strings. For example, if we examine a list of common surnames from the U.S. 1990 census, there are some names for which the CGSH occurs in roughly one out of a million people from which the list is generated. It is thus necessary for Alice and Bob to hide this information from each other. We do this by a form of chaffing. Specifically, we choose strings a' and b' so that the fraction of strings in Alice and Bob's databases with a CGSH smaller (in the sense of element-wise dominance) than χ(aa') and χ(bb') respectively is greater than some threshold. In this way, we guarantee that, even if Bob knew χ(aa') and the list of possible strings in Alice's database, the smallest group of strings which he could determine (from knowing χ(aa')) contained a will contain a fraction of the possible strings at least equal to that threshold. For example, if we choose a threshold of 0.5, then knowing χ(aa'), would only narrow down the possibilities for a by one half.

If we were to compare aa' to bb' it is possible that we might obtain matches between characters in a and b', or between characters in a' and b' etc. In order to avoid this, we choose a' and b' from alphabets which have no characters in common with each other or with the alphabet α from which a and b are drawn. Then we have $$E(aa', bb') = \begin{bmatrix} E(a, b) & 0 \\ 0 & 0 \end{bmatrix}. \quad (18)$$

But now, if we simply concatenate strings and compare aa' to bb', we will not affect the information that is obtained about the CGSH of a or b In order to effectively insert "fake" matches, instead of comparing the string aa' to the string bb', we must proceed somewhat differently. We could, for example compare the string aa'b' to the string ba'b'. Assuming we have a method of doing this, which we do, there is still another problem. The characters in a' and b' will not be involved in any transpositions, since they appear in the same order in Alice's string aa'b' as they do in Bob's string ba'b'. Thus anyone who learned E(aa'b', ba'b') would know that any character involved in a transposition was not one of those chaffing characters from a' or b'. This would decrease the effectiveness of the chaffing.

In addition to adding fake transpositions, we will need to add some fake approximate matches as well. if Carol could determine that a character in Alices string was an approximate match for two characters in Bobs string, and if she could determine that the two characters in Bob's string were different, then she would know that the character in Alice's string was one which is an approximate match for at least two other characters. If Carol learns which characters in aa'b' are exact and approximate matches for characters in ba'b', she could conceivably identify one of Alice's characters (for example) that is an approximate match for (say) eight of Bob's characters. Suppose also that no two of those characters of Bob's are exact matches for the same character of Alices. It is therefore quite likely that all of those eight characters are different characters, and since only one character ('I') is an approximate match for eight others, Alice's character is likely an 'I'.

Luckily, Carol cannot determine for certain if two or more of Bob's characters are different, since, even if one of them was an exact match for a character in Alices string and another was not, that could be because one of Bob's characters is out of range of that character of Alices. It is difficult to quantify the information that can be learned from knowing which characters are approximate matches for other characters, however the ability to add fake approximate matches will go a long way to minimize what can be learned for certain.

We thus modify our scheme somewhat, and introduce the strings a" and b". These are chosen such that a" has approximate matches and transpositions when compared to a' and b" has approximate matches and transpositions when compared to b'. Of course, a" and b" are chosen from the same alphabet as a' and b' respectively. When we combine this approach with the padding discussed above, we end up comparing the two strings x=aa$_{pad}$a'b' y=bb$_{pad}$a"b"

It is not immediately obvious how we can do this, since Alice does not know b' and Bob does not know a" but we will show how this can be done. Alice and Bob could of course simply exchange a" and b', but that might reveal something about a and b, since a and b are inputs into the process that determines a' and b' (and thus b" as well), specifically in that the fraction of strings with CGSHs dominated by that of aa' and bb' must exceed some threshold.

By using a',a",b' and b" appropriately, Alice can add any desired number of exact matches, approximate matches and transpositions to the calculation by manipulating c(a', a"), s(a', a") and r(a', a") (recall from (1), (2), (3) and the surrounding text that these represent the numbers of exact matches, approximate matches and transpositions respectively) via her choice of a' and a". Bob can similarly add any desired number of exact matches, approximate matches and transpositions to the calculation by manipulating c(b', b"), s(b', b") and r(b', b") via his choice of b' and b". The exact matches are manipulated to hide the CGSH of the strings. In the last stage, when calculating the value of the string comparator, Alice and Bob will subtract (c(a', a"), s(a', a"), r(a, a")) and (c(b', b"), s(b', b"), r(b, b")) from (c'(x, y), s(x, y), r(x, y)) so that the final value is based on the correct value of (c(a, b), s(a, b), r(a, b))

In order to calculate the number of common characters (exact matches), Carol must construct the matrix $$F = \begin{bmatrix} E(a, b) \wedge R(|a|, |b|, d(|a|, |b|)) & 0 & 0 & 0 \\ 0 & 0_{|a_{pad}| \times |b_{pad}|} & 0 & 0 \\ 0 & 0 & E(a', a'') & 0 \\ 0 & 0 & 0 & E(b', b'') \end{bmatrix} \quad (19)$$

where $0_{m \times n}$ represents an m×n zero matrix, for any positive integers m and n. If we assume that F has the property that $F_{ij}=1$ if and only if $x_i=y_j$ and $|i-j| \leq d = \max(|x|, |y|)/2-1$, and use it to calculate the number of common characters c(x, y), we will obtain c'(x, y)=c(a, b)+c(a', a")+c(b', b"). In fact c(x, y)≠c'(x, y) in general, since matching characters in a and b may be shifted out of range of each other when we construct and use x=aa$_{pad}$a'b' and y=bb$_{pad}$a'b' instead of a and b. However it is actually c'(x, y) that we are interested in, and so our protocol proceeds by constructing F and then using it as if it did actually have the property ($F_{ij}=1$ if and only if $x_i=y_j$ and $|i-j| \leq d = \max(|x|, |y|)/2-1$) when we calculate the number of exact matches. In so doing, we obtain c'(x, y)=c(a, b)+c(a', a")+c(b', b"), as required.

When calculating the number of approximate matches (similar characters) and the number of transpositions, we use the strings x and y, and obtain s(x, y)=s(a, b)+s(a', a")+s(b', b") and r(x, y)=r(a, b)+r(a', a")+(b', b").

Three Party Protocol: Permutations

In addition to adding false matches, it will be necessary to permute the order of the characters in the strings. If, for example, Alice has the string "Lee" and Bob has the string "Jeff", then if Carol had the matrix F she would know that the second and third character of Alice's string are the same. This is because they would both match the second character of Bob's string, so that $F_{22}=F_{32}=1$. We can reduce the amount of information that can be gained thus by permuting both strings x and y, so that information can be gained about the number of characters that are the same in one of the strings, but not about the position of those characters.

We adopt the convention of describing permutations as either functions, which map the final position of a set element to the original position before permutation, or as matrices, which accomplish the same permutation of elements of a column vector by premultiplying the column vector by the matrix. We will abuse notation to the extent that we will use the same symbol for the function and the matrix. Thus, for example, we could use the symbol P to refer to either the matrix $$P = \begin{bmatrix} 0 & 0 & 1 & 0 & 0 & 0 & 0 \\ 0 & 0 & 0 & 1 & 0 & 0 & 0 \\ 0 & 0 & 0 & 0 & 0 & 0 & 1 \\ 0 & 0 & 0 & 0 & 0 & 1 & 0 \\ 0 & 0 & 0 & 0 & 1 & 0 & 0 \\ 0 & 1 & 0 & 0 & 0 & 0 & 0 \\ 1 & 0 & 0 & 0 & 0 & 0 & 0 \end{bmatrix}$$

or to a function $P:[1, 7] \to [1, 7]$ such that $P(1)=3$, $P(2)=4$, $P(3)=7$, $P(4)=6$, etc. Both of these refer to a permutation in which the 3rd element of a list is moved to the first position, the 4th element is moved to the 2nd position, etc. We specify this explicitly here since it is sometimes easy to confuse this convention with one that specifies the corresponding inverse permutations. We could also make use of a convention of arranging the "natural" ordering of the elements being permuted on a row, and the new ordering on another row, so that a permutation of n elements is represented by a 2×n matrix of the form $$P = \begin{bmatrix} 1 & 2 & \ldots & n \\ P(1) & P(2) & \ldots & P(n) \end{bmatrix}.$$

For example, the permutation in the example above would be given by $$P = \begin{bmatrix} 1 & 2 & 3 & 4 & 5 & 6 & 7 \\ 3 & 4 & 7 & 6 & 5 & 2 & 1 \end{bmatrix}.$$

In order that these permutations do not lead to a change in the number of transpositions calculated, they are generated randomly, but in such a way that the relative order of identical characters in a string is unchanged. Thus, for example, if Bob's string was "Johnson", the permutation represented above would not be allowed, since it interchanges the order of the two "o"s in the string. If two characters in Alice's string matched those two "o"s, then we need to match Alice's first "o" with Bob's first "o", and Alice's second "o" with Bob's second "o". Otherwise, we would induce a spurious transposition if we matched them in reverse order.

We assume that Alice generates a random permutation $P:[1,|x|] \to [1,|x|]$ such that $P(i) < P(j)$ if $i < j$ and $(x_i = x_j$ or $i, j > |aa_{pad}a'|$. Similarly, Bob generates a random permutation $Q:[1,|y|] \to [1,|y|]$ such that $Q(i) < Q(j)$ if $i < j$ and $(y_i = y_j$ or $|bb_{pad}| < i, j \leq |bb_{pad}a'|)$. The protocols below allow Carol to learn $PFQ^T$, and not F directly.

Three Party Protocol: Finding the Number of Exact Matches

In order to calculate the number of common characters (exact matches), Carol must construct the matrix F defined in (19), up to some random permutations of its rows and columns which preserves the order of identical characters. Let $m_a = |aa_{pad}|$, $m_b = |bb_{pad}|$ and $n = |\alpha|$. Also define the $m_a \times n$ and $m_b \times n$ matrices (respectively)

$$[M_a]_{ij} = \begin{cases} 1 & \text{if } i \leq |a| \text{ and } a_i = \alpha_j \\ 0 & \text{otherwise} \end{cases} \quad (20)$$

and $$[M_b]_{ij} = \begin{cases} 1 & \text{if } i \leq |b| \text{ and } b_i = \alpha_j \\ 0 & \text{otherwise} \end{cases} \quad (21)$$

Then the upper left hand corner of F is given by $$M_a M_b^T \wedge R(m_a, n_b, d(|a|, |b|)) = \quad (22)$$
$$\begin{bmatrix} E(a, b) \wedge R(|a|, |b|, d(|a|, |b|)) & 0 \\ 0 & 0_{|a_{pad}| \times |b_{pad}|} \end{bmatrix}$$

Let $E_a = E(a', a'')$ and $E_b = E(b', b'')$, and define $R_a$ and $R_b$ to be $m_a \times m_b$ binary matrices such that $[R_a] = 1$ if and only $|i-j| \leq |a|/2 - 1$ and $[R_b] = 1$ if and only $|i-j| \leq |b|/2 - 1$. Then Protocol 26 can be used so that Carol obtains $F' = PFQ^T$.

The basic idea behind Protocol 26 is that Alice can safely send data to Bob, and send some sort of key to interpreting that data to Carol, knowing that Carol will not provide her data to Bob and visa versa. Alice creates a permutation S and two matrices $A^{(1)}$ and $A^{(2)}$ such that $S^{-1}(A^{(1)}) = M_a \mod(2)$ and $S^{-1}(A^{(2)}) = E \mod(2)$. Here, s, the integer which is used to generate the permutation S is the key, and the data is given by $M_a$ and E, which can be recovered from $A^{(1)}$ and $A^{(2)}$ respectively if the key s is known. Bob constructs $B^{(1)}$ and $B^{(3)}$, such that $B^{(3)}$ and the upper left hand corner of $B^{(1)}$ represent $M_a M_b^T \wedge R^{(b)}$ and $M_a M_b^T$ respectively, in that $T^{-1}S^{-1}(B^{(1)}) = M_a M_b^T \wedge R^{(b)} \mod 2$ and $T^{-1}S^{-1}(B^{(3)}) = M_a M_b^T \mod 2$. The lower right hand corner of $B^{(1)}$ represents $E_x$ in a similar fashion. Alice then constructs $A^{(5)}$, the upper left hand corner of which represents $M_a M_b^T \wedge R^{(b)} \wedge (1 - R^{(a)}) + M_a M_b^T \wedge R^{(a)}$. The lower right hand corner of $A^{(5)}$ represents $E_x$. The matrices $A^{(2)}, A^{(4)}, B^{(2)}, B^{(4)}$ and $A^{(6)}$ represent the logical complements of $A^{(1)}, A^{(3)}, B^{(1)}, B^{(3)}$ and $A^{(5)}$ respectively. In his last step, Bob implements an exclusive or of the matrix represented by $A^{(5)}$ with the randomly generated matrix $B^{(5)}$, by

---

Protocol 26
Matching Characters with Range Constraint - Part One

Inputs: Alice has binary matrices $M_a$, $E_x$ and $R^{(a)}$ of dimensions $m_a \times n$, $m_x \times n_x$ and $m_a \times m_b$ (respectively). Bob has binary matrices $M_b$ and $R^{(b)}$, of dimensions $m_b \times n$ and $m_a \times m_b$ (respectively), The matrices $M_a$ and $M_b$ satisfy $M_a^T e \leq e$ and $M_b^T e \leq e$ (e is a column vector of ones of the appropriate length). Alice has a permutation P: $[1, m_a + m_x] \to [1, m_a + m_x]$ and Bob has a permutation Q: $[1, m_b + n_x] \to [1, m_b + n_x]$.

Outputs: Alice and Bob obtain binary matrices A and B such that $$A \oplus B = PFQ^T \text{ where } F = \begin{bmatrix} M_a M_b^T \wedge (R_a \vee R_b) & 0 \\ 0 & E_x \end{bmatrix}.$$

1: Alice generates random integers r, s and u. She sends $m_a$, $m_x$, $n_x$ to Bob and she sends r, s and u to Carol.
2: Bob generates a random integer t and sends it to Carol.
3: Alice and Carol both generate the three random permutations R: $[1, L] \to [1, L]$ and S, U: $[1, 2L] \to [1, 2L]$, r, using r, s and u (respectively) as seeds, where $L = m_a n + (m_a + m_x)(m_b + n_x)$.
4: Bob and Carol generate the random permutation T: $[1, L] \to [1, L]$ using t as a seed.
5: Bob calculates a binary vector p such that $p_j = 1$ if and only if $\sum_j [M_b]_{ij} = 0$. Bob calculates a vector y such that $[M_b]_{j,y_j} = 1$ or $p_j = 1$ for $j \in [1, m_b]$.

Protocol 27
Matching Characters with Range Constraint - Part Two

6: Alice sends to Bob the four matrices $A^{(1)} = S(2R(X) - M_a)$, $A^{(2)} = S(2R(X) + M_a - 1)$, $A^{(3)} = S(2R(M_a n + Y) - E)$ and $A^{(4)} = S(2R(m_a n + Y) + E - 1)$, where X is an $m_a \times n$ matrix with $X_{ij} = ni + j$, Y is an $m_a \times m_b$ matrix with $Y_{ij} = m_b i + j$, the permutations R and S are applied to matrices in an elementwise fashion, and where $$E = \begin{bmatrix} 0_{m_a \times m_b} & 0 \\ 0 & E_x \end{bmatrix}.$$

7: Bob sends to Alice the $(m_a + m_x) \times (m_b + n_x)$ matrices $B^{(1)}$ and $B^{(2)}$ and the $m_a \times m_b$ matrices $B^{(3)}$ and $B^{(4)}$ such that $B_{ij}^{(3)} = T(A_{ij}^{(1)})$, $B_{ij}^{(4)} = T(A_{ij}^{(2)})$, $B_{ij}^{(1)} = T(A_{j,y_i}^{(1)})R_{ij}^{(6)} + A_{j,y_i}^{(3)})(1 - R_{ij}^{(6)}))$ for $i \leq m_a$ and $j \leq m_b$, $B_{ij}^{(1)} = T(A_{ij}^{(3)})$ for $i > m_a$ or $j > m_b$, $B_{ij}^{(2)} = T(A_{j,y_i}^{(2)})R_{ij}^{(6)} + A_{j,y_i}^{(4)})(1 - R_{ij}^{(6)})$) for $i \leq m_a$ and $j \leq m_b$ and $B_{ij}^{(2)} = T(A_{ij}^{(4)})$ for $i > m_a$ or $j > m_b$.
8: Alice sends the $(m_a + m_x) \times (m_b + n_x)$ matrices $PA^{(5)}$ and $PA^{(6)}$ to Bob, where $A_{ij}^{(5)} = U(B_{ij}^{(3)} R_{ij}^{(a)} + B_{ij}^{(1)} (1 - R_{ij}^{(a)}))$ and $A_{ij}^{(6)} = U(B_{ij}^{(4)} R_{ij}^{(a)} + B_{ij}^{(2)} (1 - R_{ij}^{(a)}))$ for $i \leq m_a$ and $j \leq m_b$, and where $A_{ij}^{(5)} = U(B_{ij}^{(1)})$ and $A_{ij}^{(6)} = U(B_{ij}^{(2)})$ otherwise.
9: Bob generate a random binary matrix $B^{(5)}$ and sends the matrix $B^{(6)}$ to Carol where $B_{ij}^{(6)} = [PA^{(5)}Q^T]_{ij}(1 - B_{ij}^{(5)}) + [PA^{(6)}Q^T]_{ij} B_{ij}^{(5)}$.
10: Carol determines the binary matrix C such that $W_{ij} = 1$ if and only if $S^{-1}(T^{-1}(U^{-1}(B_{ij}^{(6)})))$ is even. Carol sends C to Alice.
11: Alice generates a random binary matrix A and sends $Z = A \oplus C$ to Bob.
12: Bob sets $B = Z \oplus B^{(5)}$.

including elements from either $A^{(5)}$ or $A^{(6)}$, according to whether the corresponding element of $B^{(5)}$ is equal to zero or not respectively. He permutes the columns of the result and forwards it to Carol, who computes C such that $C \oplus B^{(5)} = PFQ^T$. Carol sends C to Alice, and Alice sends $A \oplus C$ to Bob who sets $B = A \oplus C \oplus B^{(5)}$ so that $A \oplus B = PFQ^T$.

For ease of notation, consider any string x to be a column vector containing the ascii values of the characters in the string as its elements. Then we can define $x' = Px (x'_j = x_{P(j)})$ and $y' = Qy (y'_j = y_{Q(j)})$. We will also let $|x|$ denote the length, or number of elements of the vector x. This will not lead to confusion as we will not require the notation $|*|$ to denote a norm of any sort.

Alice and Bob now have matrices the exclusive or of which is the matrix $F' = PFQ^T$. This is an $|x'| \times |y'|$ binary matrix such that, $F'_{ij} = 1$ only if $x'_i = y'_j$. A character in x' might match more than one character in y', so the participants must choose which characters in x' to match to which characters in y'. In order to avoid introducing transpositions into the Jaro-Winkler string comparison, we do this as follows.

For each set S of identical characters in x', (for example the set of all e's in "yvette"), we find the set of matching characters T in y' (for example the set of all e's in "yevett"), and we match the rth character in S to the rth character in T, for $r = 1, 2, \ldots \min(|S|, |T|)$. The permutations P, and Q are chosen to preserve the order of identical characters, so that if we does this (using F'), in spite of not knowing the original order of the characters in x and y, we will obtain the image under the permutations of the matches we would obtain if we were using F instead. Protocol 28 details this procedure. After executing this protocol, the number of common characters is simply given by $c(x, y) = e^T X' = e^T Y'$, where e represents a column vector of ones of the appropriate length.

Unfortunately, the procedure in protocol 28 is not possible since no one has F. Rather, Alice and Bob have A and B respectively such that $A \oplus B = F$. We do not want Alice and Bob to simply send A and B to Carol so that she can perform the computation, since that would reveal more than necessary to Carol. In order to obtain the same information, Carol must, for each row, determine the first element of the row for which A and B differ and then alter A and B so that they are identical in the columns in which those elements appear. The first of these two steps identifies the first character in Bobs string that matches the character in Alices string corresponding to the row. The second step ensures that that character of Bobs string will not be matched to any other character in Alices string later. The method of the first step is outlined in Protocol 29 and the the method of the second step is outlined in Protocol 31 and relies on Protocol 30.

Three Party Protocol: Determining the Number of Transpositions

In the previous section, we have obtained the vectors, X' and Y', which specify (respectively) which of the characters in x' and y' have common characters in the other string. Let X and Y denote those vectors corresponding to x and y respectively (instead of x' and y'), so that $X = P^T X'$ and $Y = Q^T Y'$. We say that the ith character of x (or y) is 'assigned' if $X_i = 1$ (or $Y_i = 1$). The number of assigned characters in x which appear at or before the ith character of x is given by the ith component of $p = L_x X$, where $L_x$ is an $|x| \times |x|$ binary matrix with $[L_x]_{ij} = 1$ iff $i \geq j$. Similarly, the number of assigned characters in y which appear at or before the jth character of y is given by the jth component of $q = L_y Y$.

According to the prescription in [14], we count one half of a transposition for each pair $(i, j)$ such that $X_i = Y_j = 1$, $[L_x X]_i = [L_y Y]_j$ and $x_i \neq y_j$. The last condition is equivalent to $F_{ij} = 0$.

If we now define $p' = PL_x X = PL_x P^T X'$, and $q' = QL_y Y = QL_y Q^T Y'$, then this condition Protocol 28 Matching Common Characters Inputs: Carol has $|x'| \times |y'|$ binary matrix F'.
Outputs: Carol generates $|x'| \times 1$ and $|y'| \times 1$ binary matrices X' and Y' such that $X_i' = 1$ if character $x_i'$ is matched to a common character in y' and $Y_i' = 1$ if character $y_i'$ is matched to a common character in x'.
1: Carol sets $X = 0_{|x'| \times 1}$, and $Y = 0_{|y'| \times 1}$
2: for all $i \in [1, |x'|]$ do
3:    if $X_i = 0$ then
4:       candidates $\leftarrow \{j \in [1, |y'|] \mid F_{ij}' = 1$ and $Y_j = 0\}$
5:       if candidates $\neq \phi$ then
6:          $X_i \leftarrow 1$
7:          $Y_{min(candidates)} \leftarrow 1$
8:       end if
9:    end if
10: end for
11: $X' \leftarrow X, Y' \leftarrow Y$ Protocol 29
Finding the First Match Inputs: Alice and Bob have binary vectors x and y respectively.
Outputs: Carol determines $k = \min\{m \mid x_m \neq y_m\}$.
1:    Alice sends a vector $X \oplus R$ to Bob, where R is a random integer vector and $X_i = \sum_{j=1}^{i} 2^{(j-1)} x_j$ for $i \leq |x|$.

-continued

Protocol 29
Finding the First Match

2: Bob sends a vector Y ⊕ S to Bob, where S is a random integer vector and $Y_i = \sum_{j=1}^{i} 2^{(j-1)} b_j$ for $I \leq |y|$.

3: Bob and Alice calculate α = hash(X ⊕ R ⊕ S) and β = hash(X ⊕ S ⊕ R) (where hash(*) represents some appropriate element-wise hash function) respectively and send them to Carol.
4: Carol calculates k = |{i|$α_i = β_i$}| + 1.

Protocol 30 Three Way Semi-Honest Oblivious Transfer

Inputs: Alice has n messages $m_1, m_2, ..., m_n$. Bob has an integer $j \leq n$. Carol is a semi-honest participant.
Outputs: Bob learns $m_k$ and nothing more, without revealing k.
  1: Alice generates n encryption keys $k_i$ and a permutation π. For each $i \leq n$, she sends $K_i = k_{π(i)}$ to Carol and $E(m_i, k_i)$ to Bob where E(m, k) represents encryption of the message m with the key k.
  2: Alice sends π to Bob.
  3: Bob sends $J = π^{-1}(j)$ to Carol.
  4: Carol sends $K_J = k_j$ to Bob, who uses it to decrypt $m_j$ Protocol 31 Zero Column Inputs: Alice and Bob have binary matrices A and B respectively, each with n columns. Carol has integer k.
Outputs: Alice and Bob determine matrices A and B respectively such that the kth column of
  A ⊕ B is zero and all other columns of A ⊕ B match the corresponding columns of A ⊕ B.
  1: For each $i \leq n$, Alice generates the matrix $X_i = R ⊕ A_i$, where $A_i$ represents a copy of A with the elements of the ith column set to zero and where R is a random binary matrix.
  2: For each $i \leq n$, Bob generates the matrix $Y_i = S ⊕ B_i$, where $B_i$ represents a copy of B with the elements of the ith column set to zero and where S is a random binary matrix.
  3: Carol obtains $X_k$ from Alice via Protocol 30, using Bob as a semi-honest third party.
  4: Carol obtains $Y_k$ from Bob via Protocol 30, using Alice as a semi-honest third party.
  5: Carol sends $X_k$ and $Y_k$ to Bob and Alice, respectively, who set $B = X_k$ and $A = Y - k$.

is equivalent to $X'_i = Y'_j = 1$, $p'_i = q'_j$ and $x'_i \neq y'_j$. To see this, note that, if $X'_i = 1$, then $p'_i$, by the construction of p', represents the ordinal number of the ith character of x' in the list of common characters ($X'_i = 1$), ordered according to their original order in x. A similar interpretation holds for $q'_j$ when $Y'_j = 1$. Since there are the same number of common characters in both strings (by definition), for each value of i such that $X'_i = 1$, we will find exactly one value of j such that $Y'_j = 1$ and $p'_i = q'_j$. Also note that the condition $x'_i \neq y'_j$ is equivalent to the condition $F'_{ij} = 0$ where $F' = PFQ^T$.

Protocol 33 below outlines a method by which Carol can obtain a matrix M such that $M_{ij} = 1$ iff $X'_i = Y'_j = 1$ and $p'_i = q'_j$.

The number of transpositions can be expressed in terms of F' and M according to $$t = \frac{1}{2} e_a^T (F' \wedge M) e_b \qquad (23)$$

where $e_a$ and $e_b$ are column vectors of ones of lengths |x| and |y| respectively. Note that this result is not as obvious as it seems. If the component of μ' in the ith row and jth column is non-zero, then we need to add one half to the number of transpositions for that element if the ith character of x' is the same as the jth character of y'. By the construction of F and F', this is equivalent to $F'_{ij} = 1$ if these characters come from one of the chaffing strings, since there is no range matrix involved in that case. However, the diagonal block of F which corresponds to the original strings a and b, the condition $F_{ij} = 1$ means not only that the ith character of a matches the jth character of b, but also that $|i-j| \leq d(a, b)$. Luckily, however, it turns out that if the position of those two characters within the list of assigned characters in a and b is the same, then we must also have $|i-j| \leq d(a, b)$.

This can be proved by induction as follows. Suppose that the first assigned characters in a and b are out of range (i.e they are in positions i and j for which $|i-j| > d(a, b)$) and assume without loss of generality that the character from a occurs earlier than the character from b. Then all of the characters in b are out of range of that character from a and we have a contradiction. Assume now that the first k−1 pairs of assigned characters (one from each of a and b) are within range of each other and that the kth pair is out of range. Assume, without loss of generality, that the kth assigned character of a occurs earlier than the kth assigned character of b. Then the first k assigned characters of a must all be assigned to one of the first k−1 assigned characters in b (since they are all out of range of the kth and later assigned characters from b), but this clearly leads to a contradiction, since the assignment of characters is one to one.

Carol can obtain the number of transpositions by applying Protocol 32 to obtain the elements of F' which correspond to non-zero elements of M.

Protocol 32 Transpositions

Inputs: Alice and Bob have m × n binary matrices A and B, such that A ⊕ B = F'. Carol has a binary matrix M with at most one non-zero element in each row.
Outputs: Carol obtains $t = \frac{1}{2} e_a^T (F' \wedge M) e_b$.
  1: Carol sets t ← 0
  2: Carol generates a random binary matric C and sends C to Alice.
  3: Alice sends A ⊕ C to Bob
  4: Bob calculates D = A ⊕ B ⊕ C
  5: for all $i \in [1, m]$ do
  6: If the ith row of M has a non-zero element, Carol determines the unique integer k such that $M_{ik} > 0$, and otherwise chooses k randomly.
  7: Carol applies three way oblivious transfer as in Protocol 30 to obtain $D_{ik}$.
  8: Carol adds $.5 * M_{ij} [1 - (C_{ik} ⊕ D_{ik})]$ to t.
  9: end for Three Party Protocol: Approximate Matches The version of the Jaro-Winkler string comparator used in the U.S. census includes a modification which accounts for characters which are approximate matches, in the sense that they are often mistyped for one another or erroneously substituted for one another in optical character recognition. We will denote this relation between characters by the symbol '≈'. For any two strings x and y, we define the approximate match matrix A(x, y) such that Protocol 33 Transpositions Inputs: Carol has vectors X' and Y'. Alice has permutation matrix P and Bob has permutation matrix Q. All three participants have matrices $L_x$ and $L_y$.
Outputs: Carol obtains a matrix M such that $M_{ij} = 1$ of and only if $X_i' = Y_j'$ and $p_i' = q_j'$ where
p' = $PL_xX = PL_xP^TX'$, and q' = $QL_yY = QL_yQ^TY'$.

1: Let g be the smallest prime number greater than or equal to $\max\{|x|, |y|\}$. Alice generates a random permutation G : [0, g − 1]- > [0, g − 1]. All of the following matrix operations are done over the field with elements [0, g − 1] and the random vectors are generated from this field as well, so that $Z_a$ and $Z_b$ generated below are also matrices over that field.
2: Alice randomly generates $|y| \times 1$ vector $R_a$, $|x| \times 1$ vector $S_a$ and an invertible $|x| \times |x|$ matrix $C_a$. Bob randomly generates $|x|\times 1$ vector $R_b$, $|y| \times 1$ vector $S_b$ and an invertible $|y| \times |y|$ matrix $C_b$.
3: Alice sends $C_a$ and $R_a$ to Carol and Bob sends $C_b$ and $R_b$ to Carol.
4: Carol calculates $C_aR_b + X'$ and $C_bR_a + Y'$ and sends them to Alice and Bob respectively.
5: Alice sends $T_a = PL_xP^T(C_aR_b + X') + S_a$ and $U_a = PL_xP^TC_a$ to Bob.
6: Bob sends $T_b = QL_yQ^T(C_bR_a + Y') + S_b$ and $U_b = QL_yQ^TC_b$ to Alice.
7: Alice calculates the matrix $Z_b$ such that $Z_{ij} = [T_b − U_bR_a]_j + [S_a]_i = [QL_yQ^TY']_j + [S_a]_i + [S_b]_j$ and sends $G(Z_b)$ to Carol, i.e. an element-wise mapping of $Z_b$ by G.
8: Bob calculates the matrix $Z_a$ such that $[Z_a]_{ij} = [T_a − U_aR_b]_i + [S_b]_j = [PL_xP^TX']_i + [S_a]_i + [S_b]_j$ and sends $G(Z_a)$ to Carol.
9: Carol constructs an $|x| \times |y|$ matrix μ and initializes all of its entries to zero. For each i such that $X_i' = 1$, Carol finds j with $Y_j' = 1$ such that $G([Z_a]_{ij}) = G([Z_b]_{ij})$ (and thus $p_i' = q_j'$), and sets $M_{ij} = 1$.

$$A(x, y)_{ij} = \begin{cases} 1 & \text{if } x_i \approx y_j \\ 0 & \text{otherwise} \end{cases} \quad (25)$$

Recall $\alpha = \{\alpha_i | i \in [1, |\alpha|]\}$ represents the alphabet of possible characters for a and b. For any string x, constructed from the alphabet α, we define the $|x| \times |\alpha|$ matrix N(x) such that $$N(x)_{ij} = \begin{cases} 1 & \text{if } x_i \approx \alpha_j \\ 0 & \text{otherwise} \end{cases}$$

We also define, analogous to $M_a$ and $M_b$, the $L_a \times |\alpha|$ matrix $N_a$ and the $L_b \times |\alpha|$ matrix $N_b$ such that $$[N_a]_{ij} = \begin{cases} 1 & \text{if } \leq L_a \text{ and } a_i \approx \alpha_j \\ 0 & \text{otherwise} \end{cases}$$

$$[N_b]_{ij} = \begin{cases} 1 & \text{if } i \leq L_b \text{ and } b_i \approx \alpha_j \\ 0 & \text{otherwise} \end{cases}$$

where $L_a = |aa_{pad}|$ and $L_b = |bb_{pad}|$. In order to calculate the number of approximate matches, we must calculate $M_aN_b^T = N_aM_b^T$, which has A(a, b) in its upper left hand corner.

If there were no approximate matches for fake characters (i.e. those in a' or b'), it would be obvious that any character involved in an approximate match must be real (i.e. from a or b). It is thus necessary to create false approximate matches as well. We do this in a manner analogous to that used in Section, where $M_aM_b^T/\!\!\!\backslash R(d), E(a', a'')$ and $E(b', b'')'$ are replaced by $M_aN_b^T, A(a', a'')$ and $A(b', b'')$ respectively. If we let $A_a = A(a', a'')$ and $A_b = A(b', b'')$, then Protocol 34 can be used to obtain $F'_{app} = PF_{app}Q^T$.

$$F_{app} = \begin{bmatrix} A(a, b) & 0 & 0 & 0 \\ 0 & 0_{|a_{pad}| \times |b_{pad}|} & 0 & 0 \\ 0 & 0 & A(a', a'') & 0 \\ 0 & 0 & 0 & A(b', b'') \end{bmatrix} \quad (24)$$

After executing Protocol 34, Alice and Bob each hold a matrix such that the exclusive or of the two yields $F'_{app}$. The number of approximate matches can then be obtained by applying Protocols 29 and Protocol 31. This process differs from the one used to calculate the number of exact matches in that Protocol 31 must first be used multiple times in order to effectively replace each column corresponding to a character which has an exact match with a zero column.

Three Party Protocol: Leading Character Matches

The second modification to the Jaro-Winkler string comparator requires the calculation of the number of successive characters i(a, b) in the two strings a and b being compared. Carol can obtain this via Protocol 37.

Three Party Protocol: Final Calculation

Let $\gamma_1$ denote the total number of exact matches (including fakes) calculated by Carol, and let $\alpha_1$ and $\beta_1$ denote the number of fake exact matches introduced (via E(a', a'') and E(b', b|) contributing to F) by Alice and Bob respectively. Let $\gamma_2$ denote the total number of approximate matches (including fakes) calculated by Carol, and let $\alpha_2$ and $\beta_2$ denote the number of fake exact matches introduced (via A(a', a'') and A(b', b'')) contributing to $F_{app}$) by Alice and Bob respectively. Let $\gamma_3$ denote the total number of transpositions (including fakes) calculated by Carol, and let $\alpha_3$ and $\beta_3$ denote the number of fake transpositions introduced by Alice and Bob respectively, i.e. the number of transpositions involved in comparing a' to a'' and Protocol 34
Approximate Matching - Part One Inputs: Alice has binary matrices $M_a$ and $A_a$ of dimensions $m_a \times n$ and $m_x \times n_x$ respectively. Bob has binary matrices $N_b$ and $A_b$ of dimensions $N_b \times n$ and $m_y \times n_y$ respectively. The matrix $N_b$ satisfies

Protocol 34
Approximate Matching - Part One $N_b^T e \leq e$ where e is a column vector of ones of the appropriate length. Both Alice and Bob have an upper bound g such that $M_a e \leq g e$. Alice has a permutation $P: [1, m_a + m_x + m_y] \to [1, m_a + m_x + m_y]$ and Bob has a permutation $Q: [1, N_b + n_x + n_y] \to [1, N_b + n_x + n_y]$.

Outputs: Carol obtains a matrix Z such that $Z_{ij} = Z'_{P(i), Q(j)}$ where $$Z' = \begin{bmatrix} M_a N_b^T \wedge (R_a \vee R_b) & 0 & 0 \\ 0 & A_a & 0 \\ 0 & 0 & A_b \end{bmatrix}.$$

1: Alice generates a random integer s and sends $m_a, m_x, n_y$ and s to Bob.
2: Bob sets $L = 2(m_a n + m_x n_x + m_y n_y) + m_a N_b + m_a + (m_a + m_x + m_y)(N_b + n_x + n_y)$. He divides the interval [1, L] into seven subintervals $L_1, L_2, \ldots, L_7$ of lengths $(m_a n), (m_a N_b), (m_a N_b), (m_x n_x), (m_a g + m_x n_x), (2 m_y n_y),$ and $(m_a + m_x + m_y)(N_b + n_x + n_y)$ respectively. Bob sends L to Alice. Let $L_i[j]$ denote the jth element of $L_i$.
3: Alice generates random permutation $S: [1, L] \to [1, L]$, using s as a seed.
4: Bob generates a random integer u and generates a random permutation $U: [1, L] \to [1, L]$ using u as a seed. Bob generates a random permutation $T: [1, 2m_y n_y] \to [1, 2m_y n_y]$.
5: Bob sends u to Carol, who recreates U.
6: Alice sends s to Bob, who then recreates S.
7: Continued in Part Two Below

Protocol 35 Approximate Matching - Part Two

8: Alice creates the sets $\alpha_1 = \{S(L_1[ni + j]) | [M_a]_{ij} = 1\}$, $\alpha_2 = \{S(L_4[n_x i + j]) | [A_a]_{ij} = 1\}$ and $\alpha_3 = \{S(L_5[j]) \mid |\alpha_1 \cup alpha_2| < j \leq m_a g + m_x n_x\}$.
9: Bob calculates a binary vector p such that $p_j = 1$ if and only if $\Sigma_j [N_b]_{ij} = 0$. Bob calculates a vector y such that $[N_b]_{j,y_j} = 1$ or $p_j = 1$ for $j \in [1, N_b]$. Bob creates $m_a \times N_b$ matrices C and D such that $C_{ij} = S(L_1[ni+y_j])(1 - p_j) + S(L_2[N_b i+j])_{p_j}$. He creates an $m_y \times n_x$ matrix D such that $D_{ij} = S(L_4[n_x i + j])$ and an $m_y \times n_y$ matrix E such that $E_{ij} = S(L_6[T(n_y i + j)])$. He also creates the sets $\beta_1 = \{S(L_6[T(n_y i + j)]) | [A_b]_{ij} = 1\}$ for $i \in [1, m_y]$ and $j \in [1, n_y]$, and $\beta_2 = \{S(L_6[T(j)]) \mid m_y n_y < j \leq 2 m_y n_y - |\beta_1|\}$. Bob sends $\beta_1 \cup \beta_2$ to Alice.
10: Bob creates matrices $G^1, G^2, \ldots, G^6$ of dimensions $m_a \times n_x, m_a \times n_y, m_x \times N_b, m_x \times n_y, m_y \times N_b, m_y \times n_x$, whose elements are chosen by sampling (without replacement) from the set $S(L_7)$.
11: Bob constructs the matrix $K = [[C, G_1, G_2], [G_3, D, G_4], [G_5, G_6, E]]$. Bob sends $K_1$ to Alice where $[K_1]_{ij} = [U(K)]_{i, Q(j)}$.
12: Alice constructs the $m_a \times N_b$ matrix F such that $F_{ij} = [K_5]_{ij} [R_a]_{ij} + [U(C)]_{ij} (1 - [R_a]_{ij})$
13: Alice sets $K_2 = V([[F, G_1, G_2], [G_3, D, G_4], [G_5, G_6, E]])$ and sends $K_3$ to Bob where $[K_3]_{ij} = V([K_2]_{P(i), j})$.
14: Alice sends $O = (\alpha_1 \cup \alpha_2 \cup \alpha_3) \cup (\beta_1 \cup \beta_2)$ to Carol.
15: Alice sends $K_2$ to Carol where $[K_2]_{ij} = [K_1]_{P(i), j}$.
16: Bob sends u to Carol and Alice sends v to Carol. Carol reconstructs U and V from u and v.
17: Carol constructs an $(m_a + m_x + m_y) \times (N_b + n_x + n_y)$ matrix Z such that $Z_{ij} = 1$ if and only if $[K_2]_{ij} \in V(U(O))$.

Protocol 36 Matching Common Characters

Inputs: Carol has $|x'| \times |y'|$ binary matrix $F_{app}'$ and $|x'| \times 1$ and $|y'| \times 1$ binary vectors X' and Y'.
Outputs: Carol generates $|x'| \times 1$ and $|y'| \times 1$ binary matrices $X_{app}'$ and $Y_{app}'$ such that $[X_{app}']_i = 1$ if character $x_i'$ is an approximate match to a character in y' and $[Y_{app}']_i = 1$ if character $y_i'$ is matched to a common character in x'.

1: Carol sets $X = X'$, and $Y = Y'$
2: for all $i \in [1, |x'|]$ do
3:   if $X_i = 0$ then
4:     candidates $\leftarrow \{j \in [1, |y'|] \mid [F_{app}']_{ij} = 1$ and $Y_j = 0\}$
5:     if candidates $\neq \phi$ then
6:       $X_i \leftarrow 1$

Protocol 36 Matching Common Characters

7:       $Y_{min(candidates)} \leftarrow 1$
8:     end if
9:   end if
10: end for
11: $X_{app}' \leftarrow X, Y_{app}' \leftarrow Y$

Protocol 37
Leading Character Matches

Inputs: Alice and Bob have strings a and b.
Outputs: Carol learns i(a, b).
1: Alice sends a vector $X \oplus R$ to Bob, where R is a random integer vector and $X_i = \sum_{j=1}^{i} 2^{8(j-1)} a_j$ for $i \in [1, 4]$.

2: Bob sends a vector $Y \oplus S$ to Bob, where S is a random integer vector and $Y_i = \sum_{j=1}^{i} 2^{8(j-1)} b_j$ for $i \in [1, 4]$.

Protocol 37
Leading Character Matches

3: Bob and Alice calculate $\alpha = hash(X \oplus R \oplus S)$ and $\beta = hash(X \oplus S \oplus R)$ (where hash(*) represents some appropriate element-wise hash function) respectively and send them to Carol.
4: Carol calculates $i(a, b) = |\{i \in [1, 4] | \alpha_i = \beta_i\}|$.

b' to b'' respectively. Also Let $\gamma_4 = i(a, b), \alpha_5 = |a|, \beta_6 = n$ and $\alpha_4 = \alpha_6 = \beta_4 = \beta_5 = \gamma_5 = \gamma_6 = 0$. Then the value of the Jaro-Winkler string comparator can be calculated according to Protocol 38 as $f(\alpha + \beta + \gamma \mod L)$ where L is an upper bound on |a| and b, and where f corresponds to the function $\Phi_3$ defined in Section, so that $$f(x_1, \ldots, x_6) = \begin{cases} \Phi_2 + (1-\Phi_2)\dfrac{x_1 - x_4 - 1}{x_5 + x_6 - 2x_4 + 2} & \text{if condition } (x_1, x_2, x_3, x_5, x_6) \\ \Phi_2(x_1, \ldots, x_6) & \text{otherwise} \end{cases} \quad (25)$$

where condition $(x_1, x_2, x_3, x_5, x_6) = (\Phi_1(x_1, x_2, x_3, x_5, x_6) > .7) \wedge$
$(x_1 > x_4 + 1) \wedge (4 < \min(x_5, x_6) < 2x_1 - i)$ $$\Phi_2(x_1, \ldots, x_6) = \begin{cases} \Phi_1(x_1, x_2, x_3, x_5, x_6) & \text{if } \Phi_1(x_1, x_2, x_3, x_5, x_6) \leq 0.7 \\ \Phi_1(x_1, x_2, x_3, x_5, x_6) + \\ .1x_4(1 - \Phi_1(x_1, x_2, x_3, x_5, x_6)) & \text{otherwise} \end{cases}$$

$$\Phi_1(x_1, x_2, x_3, x_5, x_6) = \Phi(x_1, x_3, x_5, x_6) + .3x_2\left(\dfrac{W_1}{x_5} + \dfrac{W_2}{x_6}\right)$$

and $$\Phi(x_1, x_3, x_5, x_6) = x_1\left(\dfrac{W_1}{x_5} + \dfrac{W_2}{x_6}\right) + W_t\left(1 - \dfrac{x_3}{x_1}\right). \quad (26)$$

Here we have identified $x_1, x_2, x_3, x_4, x_5$ and $x_6$ with $c(a, b), s(a, b), r(a, b), i(a, b), |a|$ and $|b|$ respectively, which appear in (1)-(5).

The protocol is designed to limit the number of bits of precision with which Carol can learn the value of the Jaro-Winkler string comparator. This is because, if Carol could evaluate the function with unlimited precision, then she might be able to identify not only $f(\alpha+\beta+\gamma \bmod L)$ but also $\alpha+\beta+\gamma \bmod L$ as well, since there may be only one, or a few possibilities for $(x_1, \ldots, x_6)$ for which $f(x_1, \ldots, x_6)$ takes on a particular value. Limiting the precision of f increases the number of possibilities significantly, so that it is less likely that Carol could learn learn $|a|$ or $|b|$, which is not allowed.

Conclusion

We have presented an apparatus which can implement secure algorithms for computation of string comparator metrics, including the bigram based Dice coefficient and the Jaro-Winkler string comparator. To our knowledge, this is the first example of a protocol which can calculate the bigram based Dice coefficient without requiring semi-honest participants and it is the first example of an apparatus which can calculate the Jaro-Winkler distance between two strings held by two different parties without sharing any significant information about either string to any party. The Jaro-Winkler string similarity metric can be computed by two parties which do not trust each other at all, or by three parties which are semi-honest.

We have implemented the three party version of the computation apparatus, using a Python module, which uses MPICH2 for message passing. String comparisons between randomly chosen pairs of surnames from a list of American surnames from the 1990 census required approximately 19 ms when all three participants (Alice, Bob and Carol) were run on a single computer with an Intel Core2 2.13 GHZ processor running the XP Professional operating system.

In the bigram case, although we have presented the protocol as a three party protocol, there is nothing to prevent the protocol being applied as a two party protocol as well. In this case, one of the participant simply plays the role of the third participant, Carol, in addition to playing the role of Alice or Bob. In this sense, our protocol is more general than the two party case, since it does not assume that the recipient of the calculation is one of the parties holding the strings of interest. Our protocol is secure in the general situation which allows collusion between any two parties and cheating by any party, in the sense that the algorithm will abort before anything can be learned by cheating.

---

Protocol 39 Function Evaluation - Part Two

9: For each vector e in D, Bob calculates u(e) and v(e) as (respectively) the most significant d' bits and the least significant d bits of $u(e) = \oplus_{i=1}^{l} g(Q_{i,e_i})$. Bob sends the tuples (u(e), v(e)) $\oplus$ f(e)) to Carol, in random order.
10: Carol calculates $u(\alpha + \beta + \gamma \bmod L)$ and $v(\alpha + \beta + \gamma \bmod L)$ as the most significant d' bits, and the least significant d bits (respectively) of $\oplus_{i=1}^{l} g(k_i)$. She identifies the tuple (p, q) received from Bob which satisfies $p = u(\alpha + \beta + \gamma \bmod L)$. If more than one such tuple exists, Bob and Carol return to step 3.
11: Carol determines $f(\alpha + \beta + \gamma \bmod L) = q \oplus v(\alpha + \beta + \gamma \bmod L)$.

---

Protocol 38 Function Evaluation - Part One

Inputs: Alice, Bob and Carol have integer vectors $\alpha, \beta$ and $\gamma$ respectively, all of length l with
$\alpha, \beta, \gamma \in [0, L]^l$ for some integer L. Bob has a function $f : D \to \{0, 1\}^d$ for some integer d
with domain $D \subseteq [0, L]^l$ such that $(a + b + c) \bmod L \in D$. All three also have a generator G
of an additive group X of order r, for which division by a group element (i.e. additive analog
of discrete logarithm) is difficult to compute, and all have L + 1 elements $C_0, C_1, \ldots, C_L$ of
the group. Bob and Carol also have a function $g : X \to \{0, 1\}^{d+d'}$ for some integer d'.
Outputs: Carol learns $f(\alpha + \beta + \gamma \bmod L)$.
1: Alice generates a random vector $\alpha' \in [0, L]^l$, sends $\alpha'$ to Carol, and sends $\alpha + \alpha' \bmod L$ to Bob.
2: Bob generates a random integer $y \in [0, r-1]$ and sends yG to Carol. (Note yG represents multiplication of the additive group element G by the integer y)
3: for all $i \in [0, l-1]$ do
4:     Carol generates a random integer $z_i \in [0, r-1]$ and calculates $k_i = z_i yG$
5:     Carol sends $P_i = C_{\gamma_i - \alpha_i'} - z_i G$ to Bob.
6:     For each $j \in [0, L]$, Bob calculates $Q_{ij} = y(C_{j-[\alpha+\alpha']_i - \beta_i \bmod L} - P_i)$. Note that
$Q_{i, \alpha+\beta+c \bmod L} = k_i$.
7: end for
8: Contiunued in Part Two Below We have implemented the bigram based computation on the apparatus by a Python module, which uses MPICH2 for message passing. String comparisons between randomly chosen pairs of surnames from required approximately 400 ms per comparison when all three participants (Alice, Bob and Carol) were run on a single computer with an Intel Core2 2.13 GHZ processor running the XP Professional operating system. This is quite slow relative to the algorithm in [5], however our algorithm is applicable to a different context, where semihonest participants are not required. Also, the algorithm is likely an order of magnitude faster at least than the algorithm in [2], which requires $O(n^2)$ group exponentiations compared to our $O(n)$ group exponentiations, where n represents the length of the larger string.

On the order of ninety percent of the computation in our implementation consists of elliptic point multiplications, since we used an elliptic point group, which is an additive group, to reduce the communications costs in the algorithm, instead of the somewhat more common multiplicative groups that are often used in cryptographic applications. Specialized hardware can be used to speed up the elliptic point multiplications significantly. On the order of one thousand 192-bit elliptic point multiplications per second has been reported with a maximum clock speed of 70 MHZ, whereas our 128-bit multiplications require on the order of 5 ms each. Thus we expect a speed up by a factor of 7 or so would be achievable with this hardware. In addition, more modern hardware should be able to achieve a speedup factor on the order of 30 or so, since FPGA's are available now with clock speeds in the hundreds of megahertz.

I claim:

1. An apparatus for computing a measure of the similarity of two original strings of characters, each original string being known by only one of a number of participants, in such a way that the information which can be learned about either of the strings by any party is explicitly quantified and limited, the apparatus comprising:
  a plurality of participants;
  each participant of said plurality of participants comprising a computing device equipped with:
    a processor for numerical computation;
    a memory for storage of data;
    an interface for communicating with the computing device of the other participants;
    and a set of stored instructions for executing a series of steps,
  wherein each step comprises one participant of said plurality of participants receiving a message from another participant of said plurality of participants,
  wherein each participant performs a first computation with the data in the message received together with additional existing data to generate first resultant data which is stored and performs a second computation with the data in the message received together with said additional existing data to generate second resultant data which is formed into a message transmitted to another participant;
  and a display for displaying said first resultant data;
  wherein the set of instructions is arranged such that:
  each participant generates a binary matrix, with a first participant generating Ma and a second participant generating Mb,
  with the number of rows equal to at least the number of characters in their respective string, and with the number of columns equel to at least the number of characters in an alphabet from which the characters of their original string are drawn,
  such that, for each character in the original string, there corresponds a row in the matrix with a nonzero element in the column corresponding to the ordinal number of the character which is within the ordered alphabet from which the original string is drawn.

2. An apparatus for computing a measure of the similarity of two original strings of characters, each original string being known by only one of a number of participants, in such a way that the information which can be learned about either of the strings by any party is explicitly quantified and limited, the apparatus comprising:
  a plurality of participants;
  each participant of said plurality of participants comprising a computing device equipped with:
    a processor for numerical computation;
    a memory for storage of data;
    an interface for communicating with the computing device of the other participants;
    and a set of stored instructions for executing a series of steps,
  wherein each step comprises one participant of said plurality of participants receiving a message from another participant of said plurality of participants,
  wherein each participant performs a first computation with the data in the message received together with additional existing data to generate first resultant data which is stored and performs a second computation with the data in the message received together with said additional existing data to generate second resultant data which is formed into a message transmitted to another participant;
  and a display for displaying said first resultant data;
  wherein the set of instructions is arranged such that a first participant determines via a series of oblivious transfers, the element-wise exclusive or Ma1 of a random binary matrix Rb generated by a second participant and the matrix product of Ma post-multiplied by the transpose of Mb,
  wherein the second participant determines via a series of oblivious transfers, the element-wise exclusive or Mb1 of a random binary matrix Ra generated by the first participant and the matrix product of Ma post-multiplied by the transpose of Mb;
  and wherein each participant determines that the element-wise exclusive or Ma2 of Ma1 Ra is equal to the element-wise exclusive or Mb2 of Mb1 and Rb.

3. The apparatus according to claim 2 wherein the set of instructions is arranged such that the first participant sends to the second participant, a commitment message committing to the value of Ma2, after which the second participant sends Mb2 to the first participant, after which the first participant verifies that Ma2 is identical to Mb2 and the second participant verifies that value committed to by the first participant is identical to Mb2, and wherein either participant abandons the protocol if their verification fails.

4. An apparatus for computing a measure of the similarity of two original strings of characters, each original string being known by only one of a number of participants, in such a way that the information which can be learned about either of the strings by any party is explicitly quantified and limited, the apparatus comprising:
  a plurality of participants;
  each participant of said plurality of participants comprising a computing device equipped with:
    a processor for numerical computation;
    a memory for storage of data;

an interface for communicating with the computing device of the other participants;

and a set of stored instructions for executing a series of steps, wherein each step comprises one participant of said plurality of participants receiving a message from another participant of said plurality of participants, wherein each participant performs a computation with the message received to generate data to be stored;

wherein each participant performs a first computation with the data in the message received together with additional existing data to generate first resultant data which is stored and performs a second computation with the data in the message received together with said additional existing data to generate second resultant data which is formed into a message transmitted to another participant;

and a display for displaying said first resultant data;

wherein the set of instructions is arranged such that a first participant determines, with the aid of a second participant, and in such a way that no other information is learned by either participant, a binary matrix which is an element-wise exclusive or of a binary matrix G known only to the second participant and a block diagonal matrix F with three diagonal blocks, one diagonal block being determined and known only to the first participant, another diagonal block being determined and known only to the second participant, and the other diagonal block being a binary matrix encoding all of the information necessary to determine the number of common characters and the number of transpositions in the comparison of some portion of the first participant's string and some portion of the second participant's string.

5. An apparatus for computing a measure of the similarity of two original strings of characters, each original string being known by only one of a number of participants, in such a way that the information which can be learned about either of the strings by any party is explicitly quantified and limited, the apparatus comprising:

a plurality of participants;

each participant of said plurality of participants comprising a computing device equipped with:

a processor for numerical computation;

a memory for storage of data;

an interface for communicating with the computing device of the other participants;

and a set of stored instructions for executing a series of steps, wherein each step comprises one participant of said plurality of participants receiving a message from another participant of said plurality of participants, wherein each participant performs a computation with the message received to generate data to be stored;

wherein each participant performs a first computation with the data in the message received together with additional existing data to generate first resultant data which is stored and performs a second computation with the data in the message received together with said additional existing data to generate second resultant data which is formed into a message transmitted to another participant;

and a display for displaying said first resultant data;

wherein the set of instructions is arranged such that a first and a second participant of said plurality of participants each determine a matrix unknown to the other, in such a way that no other information can be learned by either participant, and such that the exclusive or of the two matrices yields a binary matrix F', which is the result of permuting the rows and columns of F by a number of permutations, each permutation of which is known only to one of the first and second participants.

6. An apparatus for computing a measure of the similarity of two original strings of characters, each original string being known by only one of a number of participants, in such a way that the information which can be learned about either of the strings by any party is explicitly quantified and limited, the apparatus comprising:

a plurality of participants;

each participant of said plurality of participants comprising a computing device equipped with:

a processor for numerical computation;

a memory for storage of data;

an interface for communicating with the computing device of the other participants;

and a set of stored instructions for executing a series of steps, wherein each step comprises one participant of said plurality of participants receiving a message from another participant of said plurality of participants, wherein each participant performs a computation with the message received to generate data to be stored;

wherein each participant performs a first computation with the data in the message received together with additional existing data to generate first resultant data which is stored and performs a second computation with the data in the message received together with said additional existing data to generate second resultant data which is formed into a message transmitted to another participant;

and a display for displaying said first resultant data;

wherein the set of instructions is arranged such that a series of transactions occur in which, for each transaction, a first participant uses oblivious transfer to determine the element-wise exclusive or of a random binary matrix generated by a second participant and the matrix product of a permutation matrix known only to the first participant with a binary matrix known to the second participant.

7. The apparatus according to claim 6 wherein the set of instructions is arranged such that the permutations have the property that they preserve the relative order of all pairs of identical characters within some portion of one of the participants' strings.

8. An apparatus for computing a measure of the similarity of two original strings of characters, each original string being known by only one of a number of participants, in such a way that the information which can be learned about either of the strings by any party is explicitly quantified and limited, the apparatus comprising:

a plurality of participants;

each participant of said plurality of participants comprising a computing device equipped with:

a processor for numerical computation;

a memory for storage of data;

an interface for communicating with the computing device of the other participants;

and a set of stored instructions for executing a series of steps, wherein each step comprises one participant of said plurality of participants receiving a message from another participant of said plurality of participants, wherein each participant performs a computation with the message received to generate data to be stored;

wherein each participant performs a first computation with the data in the message received together with additional existing data to generate first resultant data which is stored and performs a second computation with the data in the message received together with said additional existing data to generate second resultant data which is formed into a message transmitted to another participant;

and a display for displaying said first resultant data;

wherein the set of instructions is arranged such that a permutation is determined by a first participant, with the aid of a second participant, in such a way that no more than the character group size histogram of the second participant's string can be learned by the first participant, to be such that the relative order of all pairs of identical characters within some string, some portions of which are known to only one of the first and second participants, is left unchanged by application of the permutation to the characters in the string.

9. An apparatus for computing a measure of the similarity of two original strings of characters, each original string being known by only one of a number of participants, in such a way that the information which can be learned about either of the strings by any party is explicitly quantified and limited, the apparatus comprising:

a plurality of participants;

each participant of said plurality of participants comprising a computing device equipped with:
a processor for numerical computation;
a memory for storage of data;
an interface for communicating with the computing device of the other participants;
and a set of stored instructions for executing a series of steps, wherein each step comprises one participant of said plurality of participants receiving a message from another participant of said plurality of participants, wherein each participant performs a computation with the message received to generate data to be stored;

wherein each participant performs a first computation with the data in the message received together with additional existing data to generate first resultant data which is stored and performs a second computation with the data in the message received together with said additional existing data to generate second resultant data which is formed into a message transmitted to another participant;

and a display for displaying said first resultant data;

wherein the set of instructions is arranged such that a first participant of first and second participants determines a number of transpositions between the first and second participants' strings by computing one half of the number of nonzero elements in an element-wise conjunction of the matrix F' with a row and column permuted version of a binary matrix MU', where MU' has the property that the element in the ith row and jth column of MU' is one if and only if there exists some number k such that i is the kth assigned character from the first participant's string and j is the the kth assigned character from the second participant's string.

10. An apparatus for computing a measure of the similarity of two original strings of characters, each original string being known by only one of a number of participants, in such a way that the information which can be learned about either of the strings by any party is explicitly quantified and limited, the apparatus comprising:

a plurality of participants;

each participant of said plurality of participants comprising a computing device equipped with:
a processor for numerical computation;
a memory for storage of data;
an interface for communicating with the computing device of the other participants;
and a set of stored instructions for executing a series of steps, wherein each step comprises one participant of said plurality of participants receiving a message from another participant of said plurality of participants, wherein each participant performs a computation with the message received to generate data to be stored:

wherein each participant performs a first computation with the data in the message received together with additional existing data to generate first resultant data which is stored and performs a second computation with the data in the message received together with said additional existing data to generate second resultant data which is formed into a message transmitted to another participant;

and a display for displaying said first resultant data;

wherein the set of instructions is arranged such that a first participant of the plurality of participants determines, without any of the other participants being given an opportunity to learn anything else, the image under a permutation known only to a second participant of the number of consecutive matching initial characters in the first and second participants' strings.

11. An apparatus for computing a measure of the similarity of two original strings of characters, each original string being known by only one of a number of participants, in such a way that the information which can be learned about either of the strings by any party is explicitly quantified and limited, the apparatus comprising:

a plurality of participants;

each participant of said plurality of participants comprising a computing device equipped with:
a processor for numerical computation;
a memory for storage of data;
an interface for communicating with the computing device of the other participants;
and a set of stored instructions for executing a series of steps, wherein each step comprises one participant of said plurality of participants receiving a message from another participant of said plurality of participants, wherein each participant performs a computation with the message received to generate data to be stored;

wherein each participant performs a first computation with the data in the message received together with additional existing data to generate first resultant data which is stored and performs a second computation with the data in the message received together with said additional existing data to generate second resultant data which is formed into a message transmitted to another participant;

and a display for displaying said first resultant data;

wherein the set of instructions is arranged such that two participants execute an alternating series of protocols of two types, the first type consisting of a binary search wherein one participant only learns the position of the first differing element between two vectors each of which is known to a different participant, and the second type consisting of a process which eliminates the possibility of obtaining the same result from a future execution of a protocol of the first type.

12. The apparatus according to claim 11, wherein the set of instructions is arranged such that the protocol of the second type is such that it is impossible for one of the participants to eliminate any other possibility from a future execution of a protocol of the first type, other than the one corresponding to the obtained result of the corresponding execution of the protocol of the first type, even if one of the participants fails to follow the protocol correctly.

13. An apparatus for computing a measure of the similarity of two original strings of characters, each original string being known by only one of a number of participants, in such a way that the information which can be learned about either of the strings by any party is explicitly quantified and limited, the apparatus comprising:
a plurality of participants;
each participant of said plurality of participants comprising a computing device equipped with:
a processor for numerical computation;
a memory for storage of data;
an interface for communicating with the computing device of the other participants;
and a set of stored instructions for executing a series of steps,
wherein each step comprises one participant of said plurality of participants receiving a message from another participant of said plurality of participants,
wherein each participant performs a computation with the message received to generate data to be stored;
wherein each participant performs a first computation with the data in the message received together with additional existing data to generate first resultant data which is stored and performs a second computation with the data in the message received together with said additional existing data to generate second resultant data which is formed into a message transmitted to another participant;
and a display for displaying said first resultant data;
wherein the set of instructions is arranged such that a first participant sends a representation of a binary matrix to a second participant to be used in a calculation without divulging the matrix itself by communicating a matrix of random numbers of the same size and shape to the second participant and sending to a third participant a list containing at least all the random numbers which occupy positions which correspond to nonzero elements of the matrix.

14. The apparatus according to claim 13 wherein the set of instructions is arranged such that the list sent to the third participant is padded with random numbers so that the third participant cannot determine the number of nonzero elements in the matrix.

15. The apparatus according to claim 13 wherein the set of instructions is arranged such that the second participant sends to the first participant an encoding of an array of elements from the random matrix such that the ith row and jth column of the array contains the element from the ith row and kth column of the random matrix, where k is the ordinal number of the jth character of the second participant's string in the alphabet, if the absolute value of the numerical difference between i and j is less than or equal to a threshold determined by the length of the second participant's string.

16. An apparatus for computing a measure of the similarity of two original strings of characters, each original string being known by only one of a number of participants, in such a way that the information which can be learned about either of the strings by any party is explicitly quantified and limited, the apparatus comprising:
a plurality of participants;
each participant of said plurality of participants comprising a computing device equipped with:
a processor for numerical computation;
a memory for storage of data;
an interface for communicating with the computing device of the other participants;
and a set of stored instructions for executing a series of steps,
wherein each step comprises one participant of said plurality of participants receiving a message from another participant of said plurality of participants,
wherein each participant performs a computation with the message received to generate data to be stored;
wherein each participant performs a first computation with the data in the message received together with additional existing data to generate first resultant data which is stored and performs a second computation with the data in the message received together with said additional existing data to generate second resultant data which is formed into a message transmitted to another participant;
and a display for displaying said first resultant data;
wherein the set of instructions is arranged such that the measure of similarity is a bigram based Dice coefficient and wherein the set of instructions is arranged such that a number of messages are passed between two participants, such that one or more of the messages include representations of one or more elements of an algebraic structure called a group, and such that one or more of the messages include one or more outputs of a function which operates on inputs which include the result of applying a hash function to a pair of representations of elements of the group and which include a random number and which include a number which takes on one of two values, depending upon whether a certain bigram appears in one of the strings or not

* * * * *